United States Patent
Ogasawara et al.

[11] Patent Number: 5,913,824
[45] Date of Patent: Jun. 22, 1999

[54] ULTRASOUND DIAGNOSTIC APPARATUS

[75] Inventors: Yoichi Ogasawara; Yasuhiko Abe; Ryoichi Kanda, all of Tochigi-ken, Japan

[73] Assignee: Kabushiki Kaisha Toshiba, Kawasaki, Japan

[21] Appl. No.: 08/962,293

[22] Filed: Oct. 31, 1997

[30] Foreign Application Priority Data

Oct. 31, 1996 [JP] Japan .................... 8-290932

[51] Int. Cl.⁶ .................................................. A61B 8/06
[52] U.S. Cl. ............................................................. 600/455
[58] Field of Search ........................... 600/441, 443, 600/453–455

[56] References Cited

U.S. PATENT DOCUMENTS

| | | | |
|---|---|---|---|
| 5,228,009 | 7/1993 | Forestieri et al. | 600/455 |
| 5,379,771 | 1/1995 | Kawasaki et al. | |
| 5,419,333 | 5/1995 | Hagiwara et al. | 600/455 |
| 5,662,115 | 9/1997 | Torp et al. | |
| 5,706,817 | 1/1998 | Song et al. | 600/453 |

FOREIGN PATENT DOCUMENTS 4-75644   3/1992   Japan .

OTHER PUBLICATIONS

Alan V. Oppenheim et al., "Discrete–Time Signal Processing" Prentice–Hall Inc. Chapter 2, pp. 56–63 (1989).

Steven M. Kay, Modern Spectral Estimation Theory & Application, *Prentice–Hall Signal Processing Series*, Chapter 4, pp. 63–97 (1988).

Toshiba Brochure of Diagnostic Ultrasound System SSA–270A.

*Primary Examiner*—Francis J. Jaworski
*Attorney, Agent, or Firm*—Oblon, Spivak, McClelland, Maier & Neustadt, P.C.

[57] ABSTRACT

An ultrasound diagnostic apparatus including transmitting and receiving devices, and MTI filter units to eliminate clutter components from Doppler data sequences detected trough the transmitting and receiving devices. The diagnostic apparatus further includes A/D converters to convert the Doppler data sequences in analog to those in digital and transient response processing devices provided between the MTI filter units and the A/D converters to suppress influences of transient responses consisted in output signals of the MTI filter units due to at least either one of data discontinuity of the Doppler data sequences at the time starting point or abrupt changes thereof.

19 Claims, 17 Drawing Sheets

ULTRASOUND DIAGNOSTIC APPARATUS

BACKGROUND OF THE INVENTION

1. Field of the Invention

This invention relates generally to a Doppler type ultrasound diagnostic apparatus to obtain dynamic color information of blood flows in a living body and, more particularly, to a Doppler type ultrasound diagnostic apparatus in which filter transient response characteristics are improved to eliminate from the dynamic color information various clutter components caused by reflections from internal organs such as myocardia.

2. Discussion of the Background

The color Doppler ultrasound diagnostics is an indirect diagnostic method of obtaining dynamic information of blood flows in a subject body by using ultrasound Doppler effect. Remarkable progress has been made in ultrasound diagnostic apparatus for carrying out this diagnostic method.

A ultrasound diagnostic apparatus implemented with color Doppler tomography (also referred to as "color flow mapping" (CFM)) is one of the above-mentioned diagnostic apparatus. Color Doppler tomography, or CFM, is an application of a technique used in the field of radar technology called moving target indication (MTI). CFM provides a two dimensional distribution image of blood velocity in a tomographic plane.

In order to obtain this two dimensional image, ultrasound echo signals reflecting from a subject body in response to transmitting ultrasound pulses are converted into electronic signals which are in turn divided into two components, i.e., real and imaginary parts. Both the real and imaginary parts of the echo signals are phase-detected in accordance with a reference signal through a phase detector from which Doppler signals indicative of phase shifts are derived from the reference signal. The real and imaginary parts of the Doppler signals are temporarily stored in a buffer memory after being converted into respective digital data with an A/D converter.

In the case of CFM, a plurality of transmitting and receiving ultrasound pulses are repeated N times, e.g., 16 times, in a same scanning line direction. As a result, digital Doppler data necessary for reconstruction of a video image is received as first through third dimensional data for each of the real and imaginary parts and the received data is stored in a buffer memory of an MTI filter. The first through third dimensional data represent the number of scanning lines (scanning line number), that of pixel in a depth direction of each scanning line (pixel number), and that of Doppler data for each pixel obtained by repetition of transmitting and receiving ultrasound pulses (Doppler data number), respectively.

At an identical sample position of a scanning sectional plane, receiving echoes can be obtained in a time sequential manner by repeating transmitting and receiving ultrasound pulses N times. Digital data phase-detected on the basis of the received echoes are disposed in the third dimensional direction. A signal variation velocity taken in the third dimensional direction corresponds to a size of Doppler shift frequencies, or that of a target moving velocity.

Third dimensional data (Doppler signals) received and stored in a buffer memory of an MTI filter are subject to filtering of clutter components in every data row in the third dimensional direction of each pixel position. The following is the principle of this filtering.

Echo signals from objects like blood corpuscles moving more rapidly than a certain velocity are mixed with signals from tissues, for instance, internal organs in the receiving echoes (called clutter components). The signal intensity of the clutter components is greater by about 40 dB through 80 dB than that of the echo signals from the blood corpuscles but the moving velocity of the latter is greater than that of the former. A filter circuit of the MTI filter is comprised of a high pass filter, the cut-off frequency of which is set up to eliminate the clutter components. The echo signals from the blood corpuscles are derived from the detected Doppler signals after elimination of the clutter components through the high pass filter.

The echo signals thus derived are then provided to another process for inferences of the blood corpuscle physical states (average blood flow velocity, power, distribution, etc.) and a two dimensional image is formed based upon such inferences.

As an example of an MTI filter to eliminate such clutter components as set forth above, an indefinite-duration impulse-response (II) type high pass filter is shown in FIG. 9 is provided. Generally, however, artificially high frequency signals appear on time-based waveforms of the high pass filters outputs at the start of Doppler signal, causing the filtering operations to not perform as expected. This results from transient responses due to finite data sequences passing through the filter.

These transient responses may be explained as follows. When a first of a plurality of Doppler data signals is provided to the high pass filter, a latch circuit T is in a reset state into which zero is entered as a value. Entry data into the latch circuit changes the latch value from zero to certain values (mainly clutter component values) so rapidly that a transient response is caused.

Another explanation of the transient response is now provided. Prior to a starting point, all latch circuits of the high pass filter represent zero values. This state of all zeros is shown in FIG. 20(a) by way of example. Since a discontinuous waveform appearing at a time starting point includes high frequency components, the transient response may be considered to be a phenomenon in which an influence caused by discontinuity of the starting point take place through an impulse response of the high pass filter. When Doppler data sequences with step-like discontinuity at the starting point pass through the high pass filter as shown in FIG. 20(a), high frequency components are added to its time-base waveform as shown in FIG. 20(b) because of the transient response. The high frequency components do not properly reflect blood flow dynamics because of error factors present. Therefore, any inference based upon output signals of the high pass filter at this point has poor reliability, and a final image displayed in accordance with the high frequency components cannot be accepted as a correct image of blood flows.

One technique to exclude the error factors due to the transient response is to eliminate from the filter output data a plurality of Doppler data which range from the time-base starting point to a predetermined number of sampling points, and further removing sampling points in which the high frequency components caused by discontinuity appear in the Doppler signals with N Doppler data. In the case, however, the number of Doppler data is reduced, and the inferential arithmetic operation accuracy of an averaged blood flow velocity becomes poor. In addition, initial sampling data at N points become meaningless and the property of real time is less advantageous despite a significant increase in accuracy of the inferential arithmetic operation. Thus, there are certain limitations on the number of Doppler data which can be removed from output data of the filter, however, the less data removed in accordance with the above described technique, the worse an influence on that data resulting from the transient response.

Generally, the countermeasure for the transient response has been carried out in an initial value subtraction process as set forth in Japanese Unexamined Patent Publication (Tokkai Sho) 63-84532. According to its description, an amplitude value of Doppler data at the time-base starting point is made use of as an initial data point and it is subtracted from each of subsequent Doppler data points. When this process is carried out, the time-base waveform shown in FIG. 20(a) is converted into the one shown in FIG. 20(c) so that the discontinuity, i.e., the step-like rapid change of data sequence at the time-base starting point can be eased. The Doppler data sequence processed in this way (Doppler signals) are entered into the high pass filter where the filtering process is applied.

According to the initial value subtraction process, the discontinuity at the starting point can be eased but it cannot be perfectly removed. As shown in FIG. 20(c), a discontinuity is still more or less left in the vicinity of the starting point and the high frequency components remain. In short, the discontinuity of a data value, per se, at the starting point is eliminated but an inclination angle θ indicative of a change of values at the starting point and a next sampling point cannot be avoided although data up to the starting point are substantially flat (amplitude value=0). The differential coefficient has discontinuity at the starting point which is smaller than that shown in FIG. 20(a) but the high frequency components due to the transient response appear similarly to those set forth above in the time-base output waveform of the high pass filter. It brings about the following disadvantage.

A signal sampling interval ΔT and a Nyquist frequency fn have the following relationship:

$$\Delta T = 1/(2fn) \quad (1)$$

If a velocity of blood flow of interest is relatively fast, it is necessary to set the Nyquist frequency fn to be high and the sampling interval ΔT becomes short. However, in a case where a velocity of blood flow is slow, the Nyquist frequency fn is set to be low and the sampling interval ΔT becomes long.

For this reason, in the case where fast moving blood flow is tracked from Doppler signals shown in FIG. 21(a), sampling points thereof are distributed as indicated with small circles, and in the case where slow moving blood flow is tracked, sampling points are distributed as indicated with black dots. Doppler data sequences obtained through the above sampling processes are shown in FIGS. 21(b) and 21(c) for fast and slow moving blood flows, respectively.

As clear from comparison of FIGS. 21(b) and 21(c), generally, the data change rate at the starting point becomes steeper as the sampling interval is set to be longer. A transient response amplitude appearing in a waveform passing through the MTI filter (high pass filter) becomes larger in accordance with such a steep data change rate. When a slow moving blood flow is tracked, high frequency components resulting from the transient response have a great influence. The transient response is gradually smaller as a position becomes farther from the time-base starting point, but still has a level that is not negligible at the starting point. This is one of the difficulties in detecting a slow moving blood flow with high accuracy.

On the other hand, when a diagnosis object is a rather fast moving blood flow, a data value change at the starting point is made relatively small with the initial value subtraction process and the transient response influence is negligible except for Doppler data sequences at several points from the starting point. An application of a process called "an initial data cut" thereto makes it possible to discard data at several points from the beginning after filtering process and the additional high frequency components due to the transient response can be excluded.

The initial data cut process is convenient for a fast moving blood flow but it cannot be easily applied to a slow moving blood flow because inference accuracy decreases. With slow moving blood flows, an influence range due to transient responses becomes wider as time goes further from the time-base starting point. If an initial data cut is carried out, more Doppler data (initial data) will be discarded after the MTI filtering process. As the number of cut data by application of the initial data cut increases excessively and Doppler data decrease, the inference accuracy of blood flow velocity becomes lower and precise detection of blood flow information becomes more difficult. In other words, it is important to make use of as many as possible of the N sampled Doppler data so that the influence of transient responses due to clutter components can be reduced and slow velocity blood flow information can be obtained accurately. Therefore, the initial data cut process cannot be easily carried out.

Although the initial value subtraction process is, nevertheless, utilized at the present because of the reasons set forth above, the unsolved problem is the lack of elimination capability of clutter components due to transient responses for a slow velocity blood flow.

SUMMARY OF THE INVENTION

Accordingly, one object of the present invention is to provide a novel ultrasound diagnostic apparatus which can sufficiently and securely reduce data discontinuity at the time starting point of Doppler data sequences for slow velocity blood flows, and reduce influence due to transient responses so that the apparatus can accurately detect blood flows.

Another object of the present invention is to provide a ultrasound diagnostic apparatus which additionally uses the initial data cut process to discard a part of measured data after an MTI filtering process in order to suppress influences due to transient responses, and keep the number of discarded measured data substantially zero or very small so that high accuracy inference of blood flow information can be obtained.

These and other objects are accomplished by a new and improved ultrasound diagnostic apparatus that includes transmitting and receiving circuits configured to transmit ultrasound pulses in a time sequential manner at a plurality of times in each scanning direction along a cross section of a subject body and to receive ultrasound echoes of the ultrasound pulses reflecting from the subject body in order to change the ultrasound echoes into electrical echo signals. Also included is a Doppler signal detector configured to detect plural discrete Doppler data sequences at sampling points in each scanning direction from the electrical echo signals, a filter circuit to eliminate from the Doppler data sequences clutter components due to other scattering objects in the subject body than moving fluids, a computing circuit obtain dynamic information of the fluids in accordance with outputs from the filter circuit, and a transient response processing circuit provided between the Doppler signal detector and the filter circuit to suppress influences of transient responses contained in the outputs from the filter circuit resulting from either one of data discontinuity at the time starting point of the Doppler data sequences or abrupt data changes in the vicinity thereof.

Briefly, by way of example, the moving fluid is a blood flow while a high pass filter passes Doppler components corresponding to the moving velocity of the blood flow and to cut off components corresponding to clutter.

Preferably, a suppression device is provided with a data adding device. The Doppler data sequences under consideration are those in a region ranging from a point prior to the time starting point forward to the time starting point. The data adding device extrapolates data sequences from the Doppler data sequences in a taper process to make the amplitude of the Doppler data sequences vary continuously and smoothly from zero at the time starting point to points subsequent. The data adding device then adds the same to the Doppler data sequences. The suppression device further includes a constant value subtraction device in which a constant value is subtracted from the amplitude of the Doppler data sequences. Data output from the subtraction device are subject to the taper process and adding operation as set forth above.

The data adding device, in one embodiment, is provided with a data sequence generator for generating the extrapolated data sequences which are, for instance, continuously related to the Doppler data sequences at the time starting point. The extrapolated data sequences are based upon a differential coefficient at the time starting point of the Doppler data sequences and a desired extrapolation function. The differential coefficient is first order differential, for example, defined between Doppler data at the time starting point and second Doppler data at the next sampling time.

Further, in another embodiment, a data discarding device is provided on the output side of the filtering device to discard a predetermined number of output data. Thus, the data corresponding to the added data sequences is discarded out of data output from the filtering device.

Another embodiment utilizes a suppressing device which includes data extrapolation device to infer data sequences in the past region (prior to the time starting point) from the Doppler data sequences and adding the same to the Doppler data sequences, and a taper processing device to provide the data sequences added by the data extrapolation with the taper process. That is, with respect to the added data by the data extrapolation device, the taper process device makes the amplitude of the data sequences vary from zero at the time starting point to points subsequent continuously and smoothly. The suppressing device may include such constant value adding device, data extrapolation device, and taper process device as set forth above.

In that case, the data extrapolation device and the taper process device may commonly use a data generation unit which is further provided with a generator to generate extrapolated data sequences after the taper process device performs the taper process on data sequences extrapolated by the data extrapolation device. In addition, on the output side of the filtering device, a data discarding device may be provided to discard a predetermined number of data out of the output data sequences of the filtering device. Desirably, the discarded data corresponds to the data sequences added by the data extrapolation device.

According to another embodiment, the suppressing device may have a memory device in a high pass filter and a high pass filtering process execution device. The memory device stores output data of the high pass filter with respect to extrapolated data sequences in which the amplitude values are set to vary continuously in a lapse of time from zero state to a value for connection with the Doppler data sequences, and past Doppler data to be inferred. The high pass filtering process execution device make the high pass filter carry out a high pass filtering process of the Doppler data at the time starting point by using the output data and the past Doppler data stored in the memory device.

Various embodiments of the ultrasound diagnostic apparatus of the present invention described above can decrease influence of transient responses due to data discontinuity at the time starting point of Doppler data sequences and abrupt data changes in the vicinity thereof, thereby securing a high accuracy detection capability of blood flows. According to the invention, the initial data cut process to discard a part of measured data after filtering process by the MTI filter is used to additionally suppress the influence of transient responses, the number of data to be discarded are kept substantially zero or very small and high accuracy inference of blood flow information can be achieved.

Further, more convenient and advantageous embodiments of the ultrasound diagnostic apparatus of the present invention are made available. First, the suppressing device is provided with the taper process device which performs the taper process to the Doppler data sequences in order for the amplitude of the Doppler data sequences to vary continuously and smoothly from substantially zero at the time starting point to points subsequent.

Further, the suppressing device is provided with the constant value subtraction device to subtract a constant value from amplitude values of the Doppler data sequences and the taper process device to apply the taper process to the Doppler data sequences in order for the amplitude value of the Doppler data sequences to vary continuously and smoothly from substantially zero at the time starting point to points subsequent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
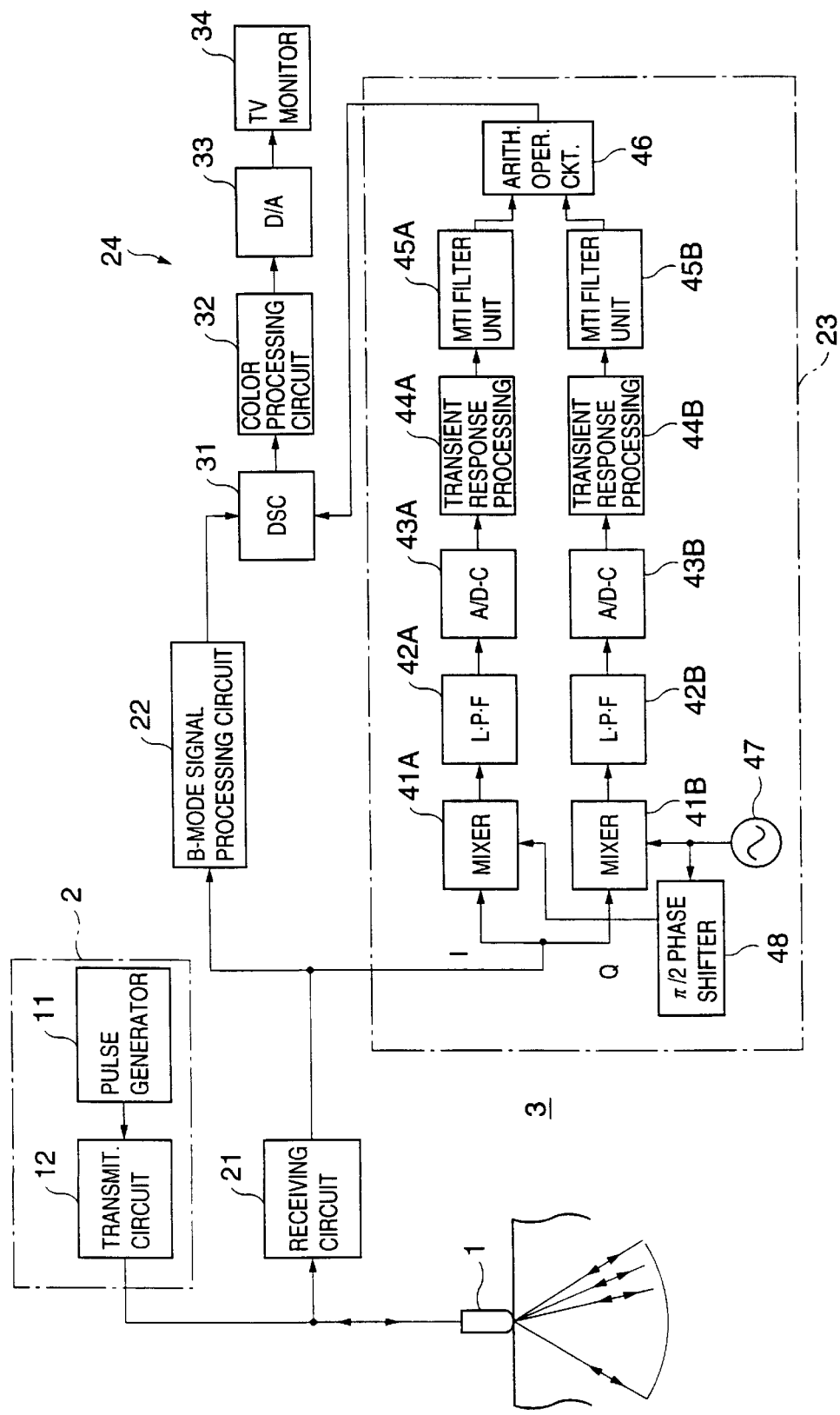
FIG. 1 is a block diagram of a color Doppler type ultrasound diagnostic apparatus of the present invention.

Referring now to the drawings, wherein like reference numerals designate identical or corresponding parts throughout the several views, and more particularly to FIG. 1 thereof, ultrasound diagnostic apparatus shown in FIG. 1 is provided with a ultrasound probe 1 capable of transducing a ultrasound signal to an electric signal and vice versa reciprocally, a transmitting circuit system 2, and a receiving and signal processing circuit 3.

The ultrasound probe 1 includes array piezoelectric vibrators (not shown) disposed at the top thereof. The array piezoelectric vibrators have a plurality of parallel disposed piezoelectric elements, the disposed direction of which is consistent with a scanning direction, and each of which makes a channel for transmission and reception.

The transmitting circuit system 2 is provided with a pulse generator 11 for generating a reference rate pulse and transmitting circuit 12 for delaying the reference pulse of the pulse generator 11 for each channel to generate a driving signal. The output driving pulse for each channel of the transmitting circuit 12 is supplied to each piezoelectric vibrator of the ultrasound probe 1. The transmitting delay time of the driving pulse is controlled for each channel and is repeatedly supplied to each channel. A ultrasound pulse is launched from each piezoelectric vibrator in response to the driving pulse. The controlled delayed ultrasound pulse forms a transmission beam, travels in the subject body, and reflects partially at a boundary plane where different acoustic impedance exist to become an echo signal. A part of or all the returning echo signal is received at the plurality of piezoelectric vibrators where it is converted into an electric signal.

The receiving and signal processing circuit 3 includes a receiving circuit 21 connected to the probe 1, a B mode signal processing circuit 22, a CFM mode signal processing circuit 23 and display circuit 24. The receiving circuit 21 is provided with preamplifiers each connected to the piezoelectric vibrator of the probe 1, delay circuits each connected to the preamplifier, and an adder to add outputs from the delay circuits. The echo signal received through probe 1 is converted into an electric analog signal which is supplied to the receiving circuit 21. In the receiving circuit 21, the electric signal is amplified for each channel, a delay time thereof is controlled for a receiving focus, and output signals are added with the adder. As a result, a receiving beam with the focus determined in response to receiving delayed time is arithmetically formed and a desired directionality thereof can be obtained.

The output terminal of the receiving circuit 21 is connected to the B-mode signal processing circuit 22 and the CFM-mode signal processing circuit 23 in parallel therewith. The B-mode signal processing circuit 22 includes a logarithm amplifier, an envelope detection circuit and an A/D converter (not shown), to make up a B-mode black and white tomographic image.

The echo signal is arranged with regard to phases and added at the receiving circuit 21 is logarithmically compressed and amplified with the logarithm amplifier, the envelope of such an amplified signal is detected by an envelope detector (envelope detection circuit), the output signal of the detector is supplied to the A/D converter, and the digital output signal of the converter is supplied to the display circuit 24 as a B-mode image signal.

The display circuit 24 includes a digital scan converter (DSC) 31 which has B-mode and CFM-mode frame memories and read/write control circuits, a color processing circuit 32 to provide pixels with colors, a D/A converter 33, and a TV monitor 34 for display. The digital envelope detected signal of the B-mode signal processing circuit 22 (B-mode image signal) is written into the B-mode frame memory of the DSC 31.

The CFM-mode signal processing circuit 23 processes the echo signal from the receiving circuit 21 to form CFM-mode image data. It has two signal processing branch systems for a real part (Q) and an imaginary part (I) of the echo signal. The Q and I signal processing systems include, in turn, mixers 41A and 41B, a low pass filter 42A and 42B, and A/D converters, respectively. The CFM signal processing circuit 23 further includes transient response processing units 44A and 44B which receive the real and imaginary parts of the A/D converters 43A and 43B, respectively, MTI filter units 45A and 45B for filtering processes to remove clutter components from the outputs of the transient response processing units 44A and 44B, respectively, and an arithmetic operation circuit 46 for various arithmetic operations with respect to blood flow dynamics based upon the output signals of the filter units 45A and 45B.

The CFM mode signal processing circuit 23 is yet further provided with a reference signal oscillator 47, and a phase shifter 48 to provide the mixer 41A with the reference signal of the oscillator 47 with a 90 degrees phase shift from that supplied directly to the mixer 41B. The reference signal oscillator 47 is driven in synchronism with the pulse generator in the transmitting circuit system 2. The reference signal has substantially the same frequency as the ultrasound signal.

The output echo signal of the receiving circuit 21 consists of the real and imaginary parts which are multiplied by the reference signal in the mixers 41A and 41B, respectively. The output of the mixers 41A and 41B include high frequency components which are removed by low pass filters 42A and 42B to make base band signals. Namely, the real and imaginary parts of the echo signal are respectively subject to phase detection (quadrature phase detection) by mixers 41A and 41B, and the low pass filters 42A and 42B, and the base band Doppler signals reflecting phase shifts from the reference signal are derived therefrom. The real and imaginary parts of the Doppler signal are also respectively converted into digital signals through the A/D converters 43A and 43B. The digital signals are then supplied to the transient response processing units 44A and 44B which are provided to reduce transient response phenomena resulting from discontinuity at the time starting point of the Doppler signal and/or abrupt changes thereof in the vicinity of the starting point.

The MTI filter units 45A and 45B, which receive the Doppler signals processed with the transient response processing units 44A and 44B, are provided to remove unnecessary echo signals reflecting from myocardial walls and other clutter reflections and to perform an initial data cut process. With the MTI filter units 45A and 45B, Doppler components from substantial organs (clutter components) are accurately removed from the entire Doppler signal and blood flows are derived from remaining Doppler components.

The real and imaginary parts of the Doppler data filtered out through the MTI filter units 45A and 45B, respectively, are supplied to the arithmetic operation circuit 46 which infers dynamic information of blood flows therefrom. The arithmetic operation circuit 46 has an auto-correlator, for instance, and other computing circuits making use of correlation results supplied therefrom, such as an average velocity computing circuit, a dispersion computing circuit, and a power computing circuit, and carries out inference operations of information as to average velocity of blood flows, dispersion of velocity distributions, and power of signals reflected from blood flows. The computed results therefrom are stored in the CFM frame memory of the DSC 31 temporarily as CFM-mode image data.

In the DSC 31, image data stored in the B-mode frame memory and the CFM-mode frame memory are read out in standard TV format. In parallel with this reading-out operation, an alternative selection is made between one of common images stored in both frame memories so that frame image data are formed with CFM-mode images superimposed on B-mode images (background images). After being provided with color and converted into analog signals at predetermined timing through the color processing circuit 32 and the D/A converter 33, respectively, the image data is displayed on the TV monitor 34.

Transient Response Processing

Before explaining the structure and functions of the transient response processing units 44A and 44B, Doppler signals to be supplied thereto are described.

In order to form the CFM-mode images, transmitting and receiving ultrasound pulses in an identical scanning direction are repeated N times (16 times, for instance). An echo signal obtained through each transmitted and received ultrasound pulse is subject to quadrature phase detection to form Doppler data which, in turn, is stored in buffer memories of the transient response processing units 44A and 44B. As a result, base band digital Doppler data stored in each buffer memory have three dimensions.

Figure 2:
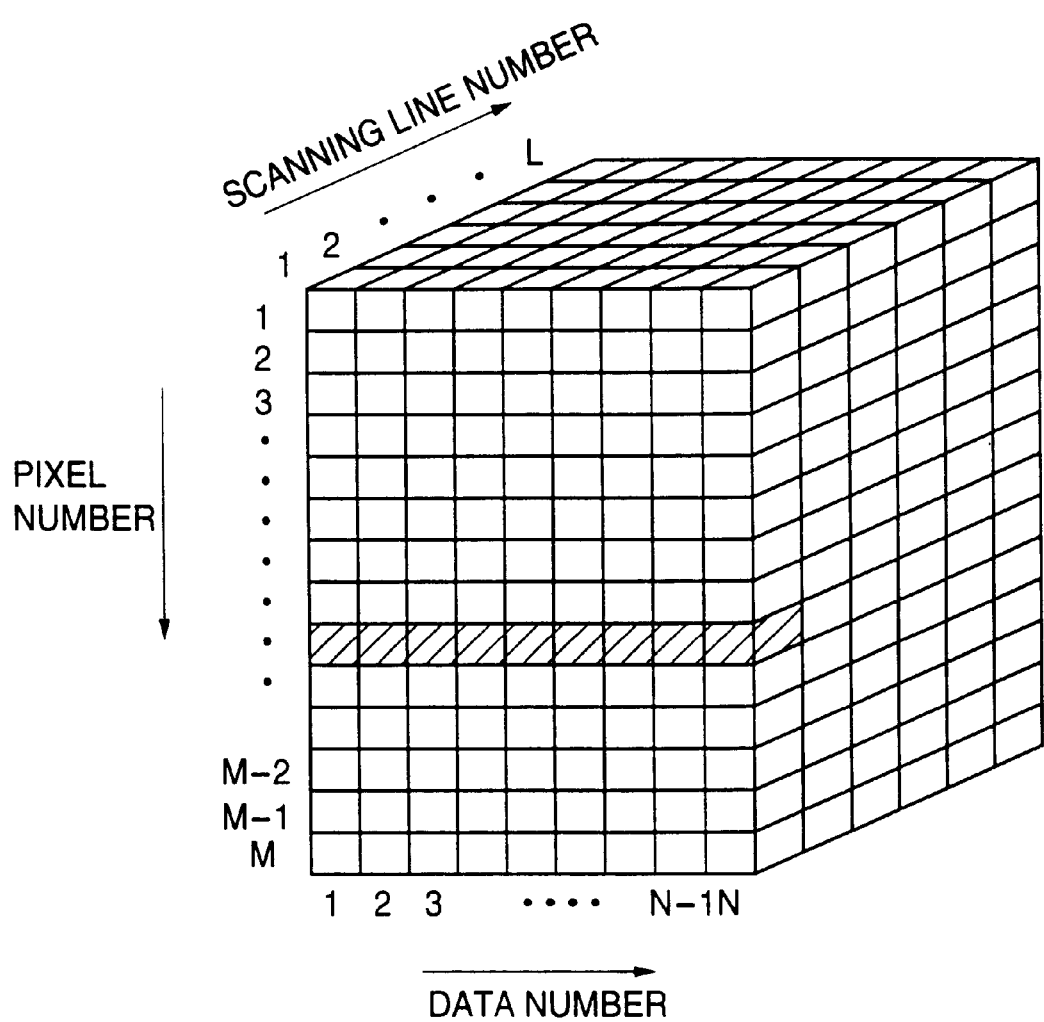
FIG. 2 is a schematic diagram of receiving data obtained at a color flow mapping (CFM) mode.

As shown in FIG. 2, the first dimension represents the number of scanning lines (number) 1 through L, the second dimension the number of pixels (number) 1 through M along the depth direction for each scanning line and the third dimension the number of Doppler data (number) 1 through N obtained by repetition of transmitting and receiving for each pixel. The number of Doppler data is referred to as "Data number" hereinafter. Each N Doppler data (hatched portions in FIG. 2) in the third dimension direction obtained in time sequential manner for each sampling point is independently processed in the CFM-mode to derive dynamic information of blood flows at every pixel. For this purpose, as shown in FIG. 3($a$), Doppler signals $Zi$ ($Qi$ or $Ii$, i=1, 2, 3, . . . ,N) formed with a plurality of time sequential Doppler data for each of the real and imaginary parts Q and I are supplied to the transient response processing units 44A and 44B, respectively, at every sampling point of the scanning plane.

Each of the transient response processing units 44A and 44B suppresses transient responses resulting from the amplitude discontinuity of discrete data at the initial time point t=0 (called the time starting point) of the Doppler data in each Doppler signal $Zi$ or abrupt amplitude changes adjacent thereto so that the Doppler data is provided with smooth time characteristics, i.e., the processes of adding extrapolated data sequences and taper.

The concepts of the taper and extrapolation processes which are cores of the transient response process are individually explained to begin with. Depending on the processing structure of a respective embodiment, the taper and extrapolation processes may be functionally carried out at the same time or independently, or the taper process in combination with other processes may be applied.

Figure 3A:
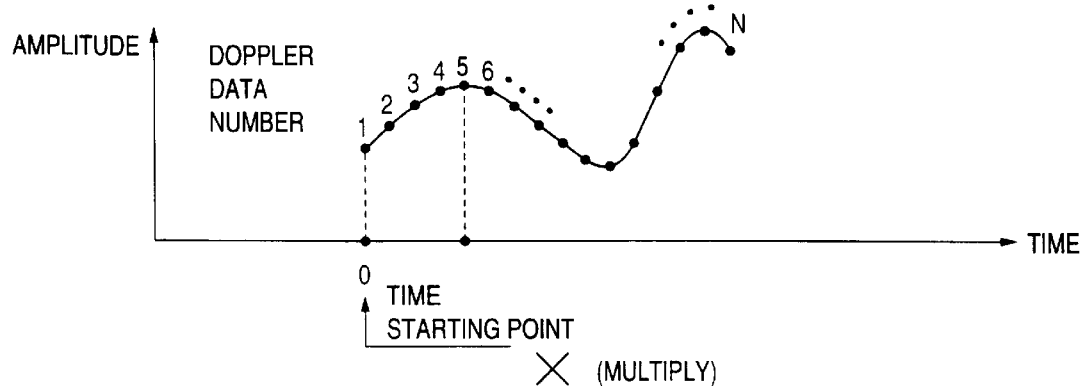
FIG. 3(a) through 3(c) are graphs illustrating a taper process applied to Doppler data sequences (Doppler signals)
Figure 3B:
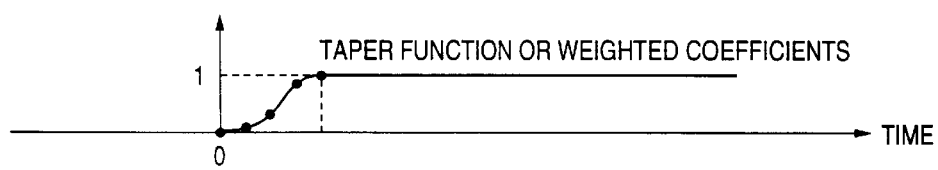
Figure 3C:
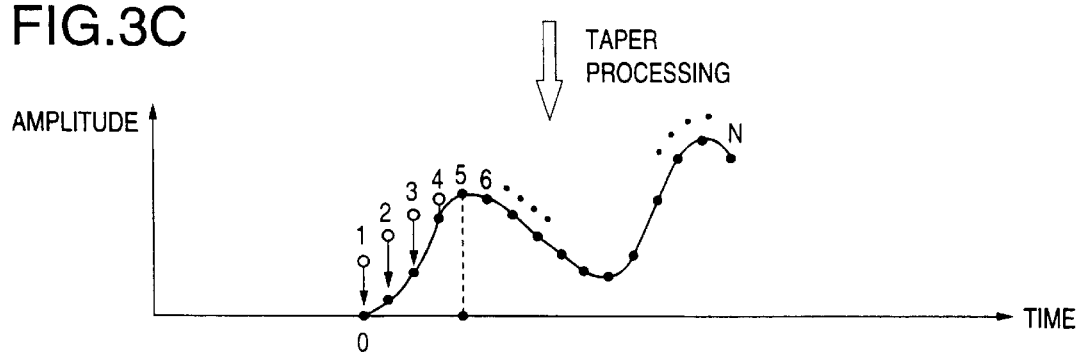

The concept of the taper process is that Doppler signals which are discontinuous at the time starting point t=0 or are of abrupt time dependent changes adjacent thereto as shown in FIG. 3($a$) are multiplied by a taper function or weight coefficients which have a smooth attenuation characteristic around the time starting point as shown in FIG. 3($b$). Any of "Hanning window", "Blackman window", "Hamming window", etc., may be used for an attenuation characteristic of this sort. This smooth attenuation characteristic is limitedly applied to the Doppler data in the neighborhood of the time starting point.

In the case of FIG. 3($b$), Doppler data at five points including the time starting point is multiplied by a taper function (or weighted coefficients) varying smoothly from 0 to 1, as shown in FIG. 3($b$). A taper function (or weighted coefficients) multiplied by a sixth or further point of the Doppler data is 1. This taper process as shown in FIG. 3($c$) suppresses the discontinuity at the time starting point or abrupt data changes in the vicinity thereof and a new Doppler signal varying from the amplitude=0 at the time starting point to several points of the original amplitudes of the Doppler data is derived therefrom. As the number of Doppler data to which the taper process is applied increases, changes thereof from the time starting point by time becomes more smooth.

Figure 4A:
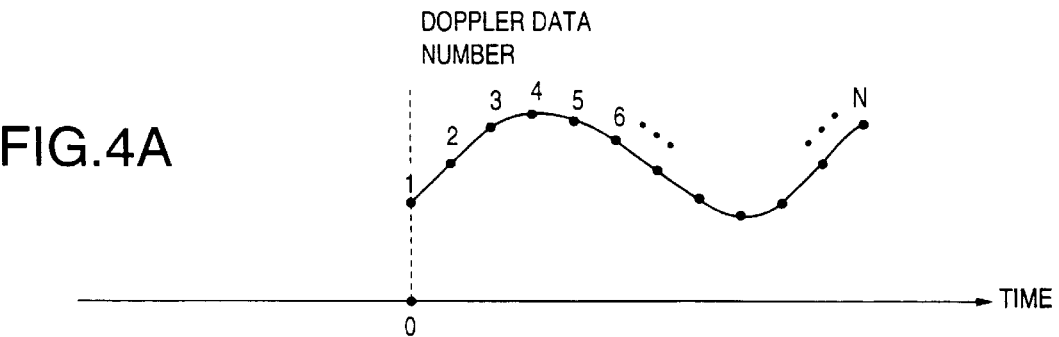
FIGS. 4(a) and 4(b) are graphs illustrating an extrapolation process.
Figure 4B:
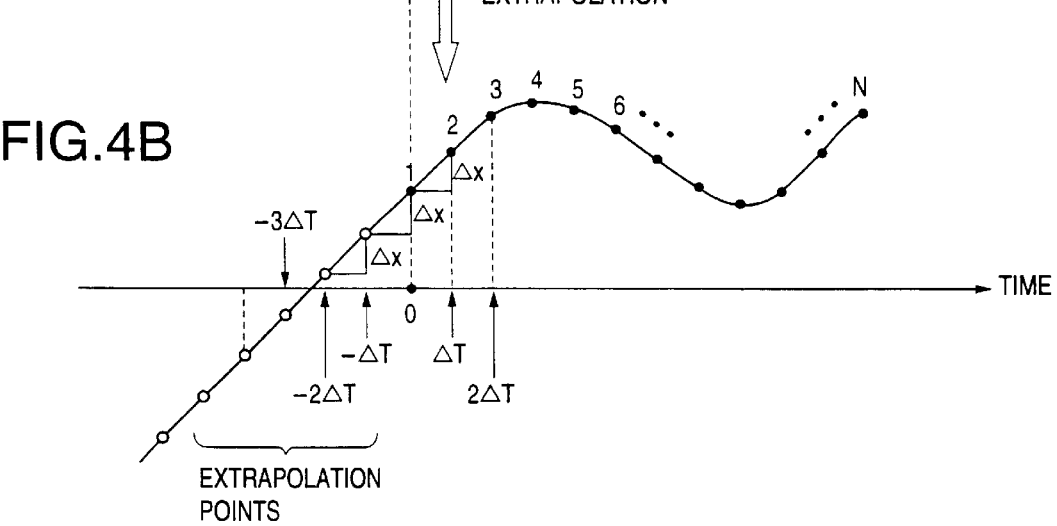

The extrapolation process will be hereinbelow described with reference to FIGS. 4($a$) and 4($b$). Transient responses of the high pass filter due to the discontinuity at the time starting point have less impacts as a lapse of time from the time starting point is longer. Based upon this fact, a time point which is not substantially influenced by the transient responses is moved up to the time starting point.

In order to attain that movement, the extrapolation process is executed. The extrapolation process is carried out in such a way that actually measured Doppler data sequences shown in FIG. 4($a$) have additionally inferred past data sequences before the time starting point as shown in FIG. 4($b$). Preferably, in order to make influence due to transient responses minimum, the past data sequences are inferred to make differential coefficients before or after the time starting point continuous and are added to the actual data sequences.

A linear function derived primarily from the first two points (the time starting and its next point) of the actually measured Doppler data sequences may be used as an extrapolation function with its continuous first-degree differential coefficients. A slope of $\Delta X/\Delta T$ between data No.1 and No.2 is computed to infer a linear function determined thereby and extrapolation points (added points) subsequent thereto on the linear function are then determined (see FIG. 4(b)).

If an extrapolation function used for the extrapolation process basically complies with such an essential requisite for suppression of transient responses that a differential coefficient at the time starting point is continuous, it is not limited to the linear function set forth above. When the data have a low S/N ratio, for instance, a trend derived from data at an initial few points may provide an extrapolation function. In order to obtain that trend, mathematics techniques such as least square approximation may be used. Although a complex function is not necessarily applied to the extrapolation process, an extrapolation function may be set on condition that higher order differential coefficients are continuous. In this way, by using an extrapolation function, data sequences in the past are artificially extrapolated to move the time starting point to a later point on the time axis.

In addition to the essential requisite, extrapolated data sequences must be attenuated smoothly to zero at a head point. Since the extrapolated data are artificially made and are primarily used for suppression of transient responses, it must be discarded through the initial data cut process after high pass filtering. In short, the extrapolated data sequences are never used for inference of blood flow information.

The transient response processing units 44A and 44B each include a buffer memory 51 provided on its input side, an extrapolation circuit 55 provided on the reading-out side thereof, a controller 53 to control the buffer memory 51 and the extrapolation circuit 55. The received Doppler data group with three dimensions as shown in FIG. 2 are supplied from the A/D converters 43A and 43B to respective buffer memories 51 in transient response processing units 44A and 44B and are stored there.

Figure 6:
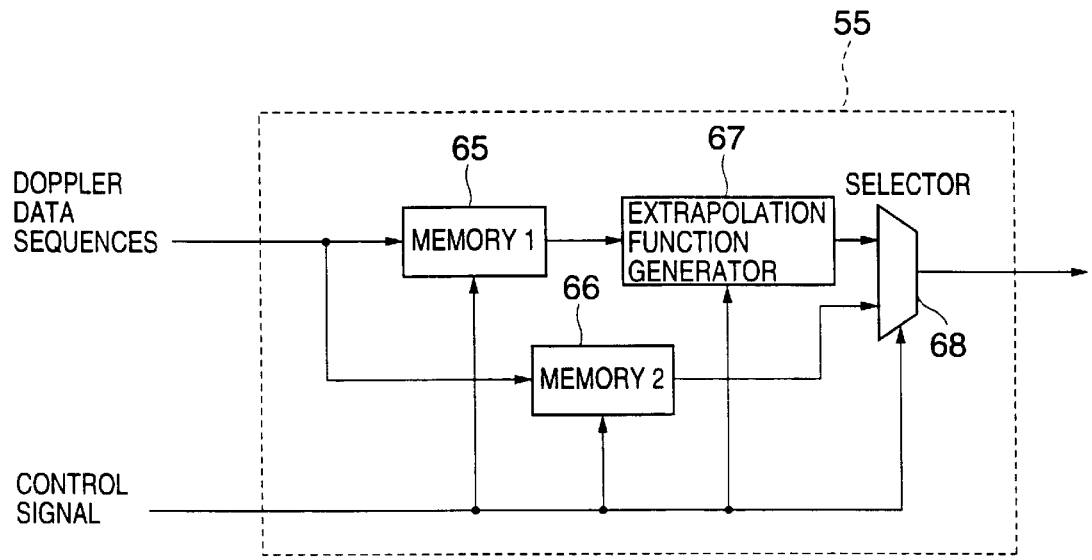
FIG. 6 is a block diagram of an extrapolation unit.

Structure of the extrapolation circuit is shown in FIG. 6. The extrapolation circuit 55 is provided with first and second memories 65 and 66, an extrapolation function generator 67, and a selector 68. The memory 65 stores initial data or several successive data derived from Doppler data sequences (measured data sequences) in response to a control signal and provides its stored data to the extrapolation function generator 67. With reference to the data provided by the memory 65 the function generator 67 determines one of extrapolation functions determined and store in advance, generates an extrapolated data sequences (data sequences in the past before the time starting point to be added) by taper processing of the extrapolation function, and provides the same to the selector 68. The extrapolation function generator 67 supplies the extrapolation points (extrapolation function) shown in FIG. 4 with the extrapolated data sequences to which the taper process shown in FIG. 3 is applied. In parallel with this operation, the second memory 66 temporarily stores a series of the Doppler data sequences (measured data sequences) in response to the control signal, reads out the same after a predetermined timing, and provides it to the selector 68.

In response to the control signal, the selector 68 is initially switched to the side of the first memory 65 so that the extrapolated data sequences of the extrapolation function generator 67 are selected and, thus, are output data of the extrapolation circuit 55. After completion of output of the extrapolated data sequences, the selector 68 is switched to the side of the second memory 66 and the measured Doppler data sequences are selected as output data of the extrapolation circuit 55. The addition of the taper-extrapolated data sequences is carried out at every sampling point of the scanning tomographic plane.

MTI Filter Unit

Figure 5:
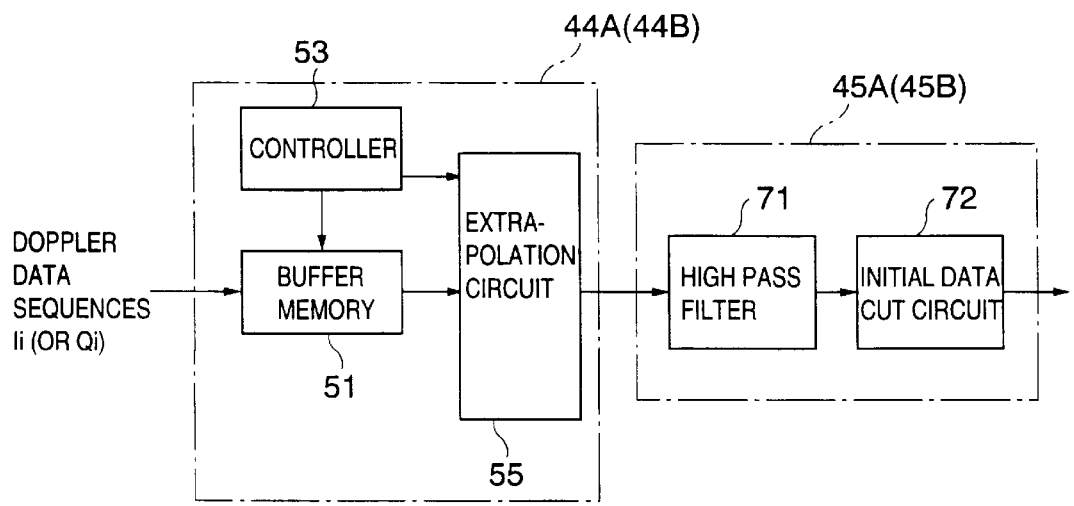
FIG. 5 is a block diagram of a transient response processing unit of the present invention.

The structure and operation of the MTI filter units 45A and 45B will be explained hereinbelow. As shown in FIG. 5, the MTI filter units 45A and 45B each have a high pass filter 71 provided on an input side and an initial data cut circuit 72 which performs the initial data cut process to cut (eliminate) several points of initial data from the output of the high pass filter 71.

Figure 7:
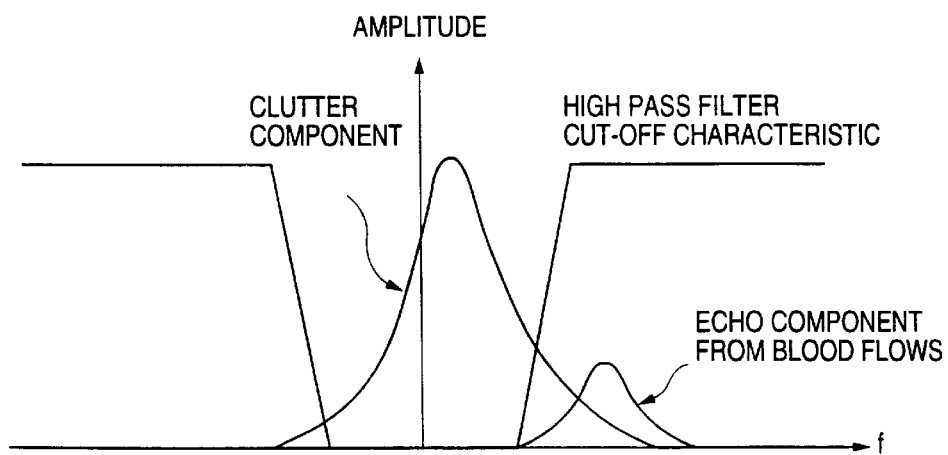
FIG. 7 is a graph illustrating frequency characteristic curves of a high pass MTI filter.

The high pass filter 71 may be a finite-duration impulse-response (FIR) type or an infinite-duration impulse-response (IIR) type filter in structure which cut-off characteristics are set to eliminate echo (clutter) components reflecting from organs such as myocardia, etc., and to pass echo components reflecting from blood flows as shown in FIG. 7. The initial data cut circuit 72 cuts data at a plurality of predetermined time points including the time starting point from output waveforms of the high pass filter 71. In the present embodiment, an amount of cut data may be set to be less than a conventional apparatus because the transient response processing units 44A and 44B are provided to significantly suppress high frequency components due to transient response phenomena appearing in the output waveforms of the high pass filter 71.

The amount of cut data by the initial data cut circuit 72 may be zero depending on effectiveness of the transient response process. In other words, it is even possible not to provide the initial data cut circuit 72 to the MTI filter units 45A and 45B.

Total Operation and Advantages

Operation of the ultrasound diagnostic apparatus of the present invention will be described hereinbelow as a whole. When the ultrasound diagnostic apparatus is enabled to carry out an electronic sector scanning mode through the transmitting circuit 2 and the probe 1, echo signals in response to the scanning are received through the probe 1. The echo signals are then provided to the receiving and signal processing circuit 3. After application of a receiving focus process to the received echo signals through the receiving circuit 21, output signals thereof are supplied to the B-mode processing circuit 22 and the CFM-mode processing circuit 23.

Figure 8A:
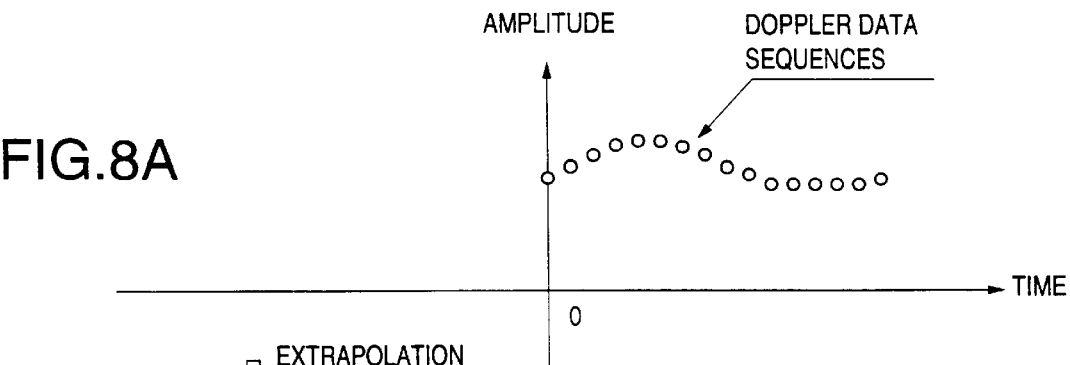
FIGS. 8(a) through 8(c) are graphs illustrating an extrapolation process adopting a taper process, a high pass filtering process and an initial data cut process.

In the CFM-mode processing circuit 23, the echo signals are subject to the quadrature phase detection and the A/D conversion, thus converting the echo signals into discrete digital Doppler data. The Doppler data are temporarily stored in the buffer memory 51 of the transient response processing circuit 44A (44B). The stored Doppler data are read out from the buffer memory 51 at fixed timing in accordance with Doppler data time sequences (Doppler signals) consisting of N Doppler data at every sampling point of the tomographic plane as shown in FIG. 8(a). The Doppler data sequences are transferred to the extrapolation circuit 55 where the taper-extrapolated data sequences are added to the Doppler data sequences.

Figure 8B:
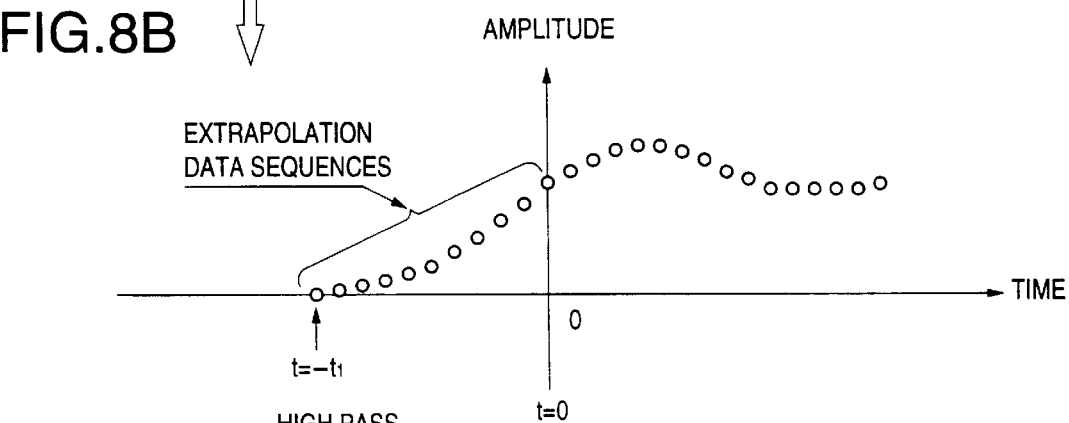

Namely, the discrete Doppler data sequences shown in FIG. 8(a) are provided to the extrapolation circuit 55 to make the same into data sequences as shown in FIG. 8(b). First, taper- extrapolated data sequences artificially made in the negative direction from the time starting point of the input Doppler data sequences are temporarily added. As shown in FIG. 8(b), this extrapolation is performed in such a way that an extrapolation function consisting of a plurality of extrapolation points is inferred from a linear function approximated by a slope defined between initial and second values of the Doppler data sequences to make differential coefficients continuous at the time starting point t=0. The end point of the extrapolated past data, i.e., t=-t1 is artificially presumed to be the time starting point so that the entire inherently measured Doppler data sequences can be far from the time-influence range of transient responses.

The extrapolated Doppler data sequences including the taper process vary smoothly in the negative time direction of the extrapolated data sequences as shown in FIG. 8(b) and the amplitude data are approximately zero at the artificial time starting point t=-t1.

Figure 8C:
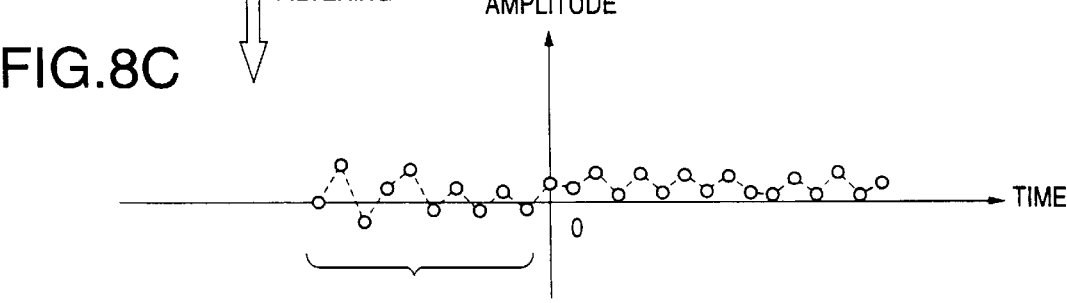

The Doppler data sequences subjected to the extrapolation process (functionally including the taper process) are supplied to the MTI filter units 45A and 45B where the high pass filtering is applied thereto. Since the extrapolated Doppler data sequence is zero in amplitude at the artificial time starting point (t=-t1) and subsequent changes are quite smooth, high frequency components due to transient responses appearing in output waveforms are considerably suppressed. In addition, the artificial time starting point is extrapolated to the actual time starting point to make transient response effects in the filter output waveforms further out on the time range. In short, as shown in FIG. 8(c), no high frequency components due to the transient responses appear in the measured Doppler data sequences at the actual time starting point and points thereafter.

The output signal of the high pass filter 71 is supplied to the initial data cut circuit 72 in which subsequent data corresponding to the extrapolated data sequences are discarded.

All the measured Doppler data remain unchanged and are supplied to the arithmetic operation circuit 46.

Filtered, and processed as set forth above, few are transferred to the arithmetic operation circuit 46, and the arithmetic operation obtains various blood flow information as already described. The arithmetic operation circuit 46 carries out the arithmetic operation and infers the blood flow information based upon the entire measured Doppler data sequences. The DSC 31 synthesizes the blood flow information with the B-mode image supplied from the B-mode signal processing circuit 22. The resultant image data are supplied to the TV monitor 34 through the color processing circuit 32 and the D/A converter 33 and are displayed thereon as two dimensional images of blood flow distributions.

According to the present embodiment, the taper-extrapolated data sequences are added to the Doppler data sequences supplied to the MTI filter units 45A and 45B. It is feasible to suppress, more accurately than conventional processes, the amplitude and range of high frequency components included in the filter output waveforms due to the transient responses based on discontinuity of the Doppler data sequences at the time starting point and the abrupt changes in the vicinity thereof.

Namely, since extrapolated data sequences processed with the taper set up at appropriate extrapolation points make the transient response effect far from the inherent input data, the effect to take place in this embodiment is more surely avoidable than the previous embodiment and its measured Doppler data are not discarded but utilized at the maximum extent to infer the blood flow information. Those advantages become greater as the number of extrapolation points increase. The clutter components can be certainly reduced in this particular embodiment, the inference of blood flow information is more accurately obtainable than the previous embodiment, and the detection resolution of the present embodiment is improved greatly for extremely slow velocity blood flows.

Since the extrapolation in accordance with this embodiment is set up to make the amplitude at the artificial time starting point zero, it provides a great advantage to substantially reduce the transient response effect.

In the case of slow velocity blood flows, the initial data cut process is effectively applicable to the output data waveforms of the MTI filter units. In other words, it is sufficient to make the initial data cut correspond to the extrapolated data sequences. The number of the Doppler data actually used for the inference operation at the arithmetic operation circuit 46 covers the entire measured data to obtain blood flow information with higher accuracy in the cases of not only high velocity but also low velocity and the detection capability can be greatly improved.

In the case of extremely low velocity blood flows and, in particular, lower than 5 cm/sec, it is not sufficient to carry out only an initial value subtraction process because it lacks detection capability. Where the number of cut data increases, however, in the initial data cut process in order to eliminate transient responses, the inference accuracy cannot be secured for the velocity. The present invention, on the other hand, has great validity by utilizing the extrapolation and taper processes so that a maximum number of data points can be secured for the inference of blood flow information. As a result, it is certainly feasible to track an extremely low velocity blood flow.

When the number of extrapolation points for the extrapolated data sequences is small in the present embodiment, some influences due to transient responses remain at the actual time starting point and its vicinity. Nevertheless, the amount of cut data at the initial data cut circuit is small in this particular case compared with the case when an extrapolation process is not performed and almost all the measured Doppler data sequences can be utilized for the arithmetic operation of blood flow velocity. This is why high accuracy can be still maintained for arithmetic operations of the velocity.

Second Embodiment

Figure 9:
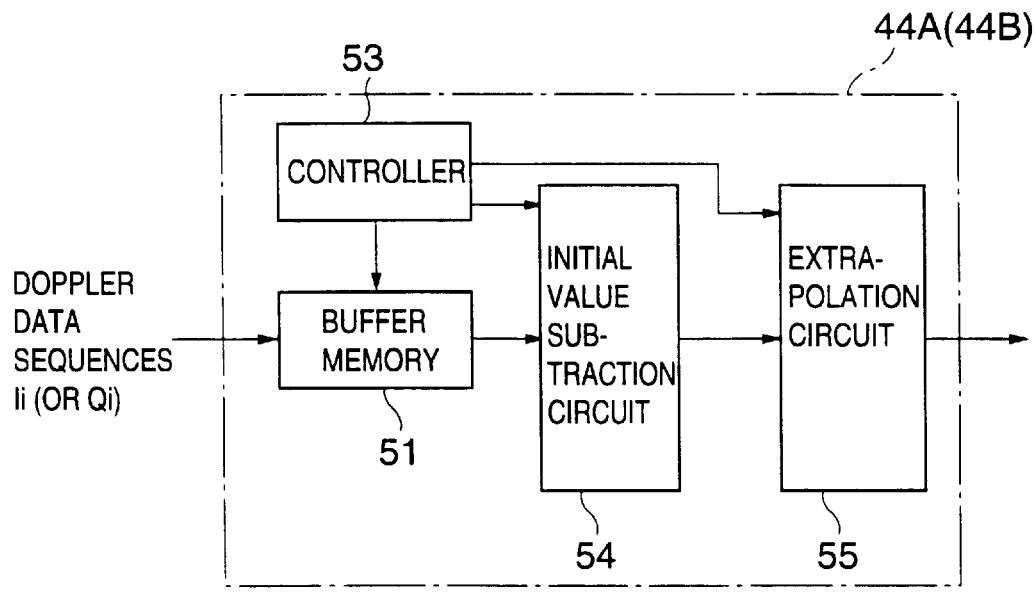
FIG. 9 is block diagram of a second embodiment of the transient response processing unit of the present invention.
Figure 10:
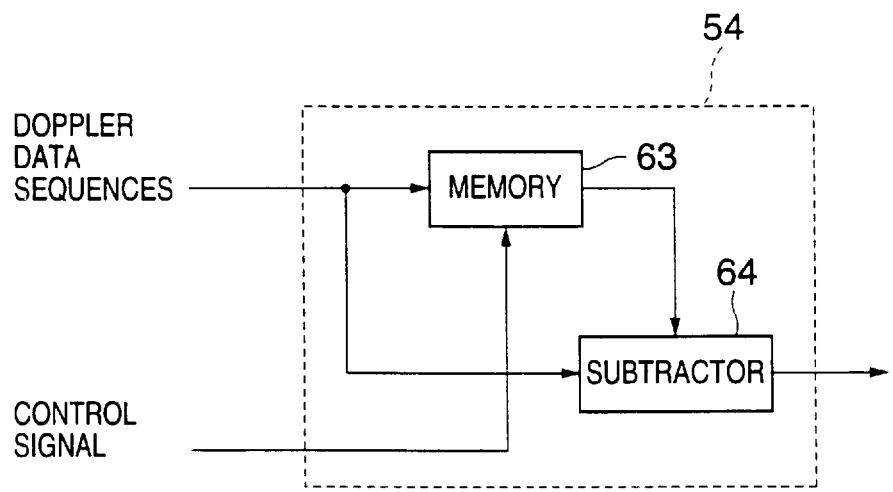
FIG. 10 is a block diagram of an initial value subtraction unit.

A ultrasound diagnostic apparatus of a second embodiment of the present invention will be explained hereinafter with reference to FIGS. 9 through 11. From now on, substantially the same or similar elements of embodiments have identical reference numerals and/or symbols and explanations thereof are omitted or briefly made for the sake of simplicity.

The ultrasound diagnostic apparatus of this embodiment carries out the initial value subtraction process in combination with the extrapolation process including the taper process. To achieve those processes, the transient response processing units 44A and 44B have the structure shown in FIG. 9.

The transient response processing units 44A and 44B each has a buffer memory 51, an initial value subtraction circuit 54, and an extrapolation circuit 55 connected in series on the reading-out side of the buffer memory 51 as shown in FIG.

9. A controller 53 is also provided to control operations of the buffer memory 51 and the initial value subtraction circuit 54. The structure thereof is substantially the same or similar to that of the embodiments already described.

The initial value subtraction circuit 54 subtracts a fixed value from the Doppler data sequences to avoid the discontinuity of data at the time starting point. As shown in FIG. 10 in detail, the initial value subtraction circuit 54 is provided with a memory 63 for storing initial values of the Doppler data sequences and a subtracter 64. The memory 63 stores the initial values (fixed values) of the Doppler data sequences in response to a control signal of the controller 53 and outputs the same to the subtracter 64 at every time when the Doppler data are inputted. The subtracter 64, also provided with the Doppler data sequences, subtracts the initial values from the amplitude of each data of the Doppler data sequences and supplies its result to the extrapolation circuit 55.

The other structures of the second embodiment ultrasound diagnostic apparatus are the same as those of the first embodiment.

Figure 11A:
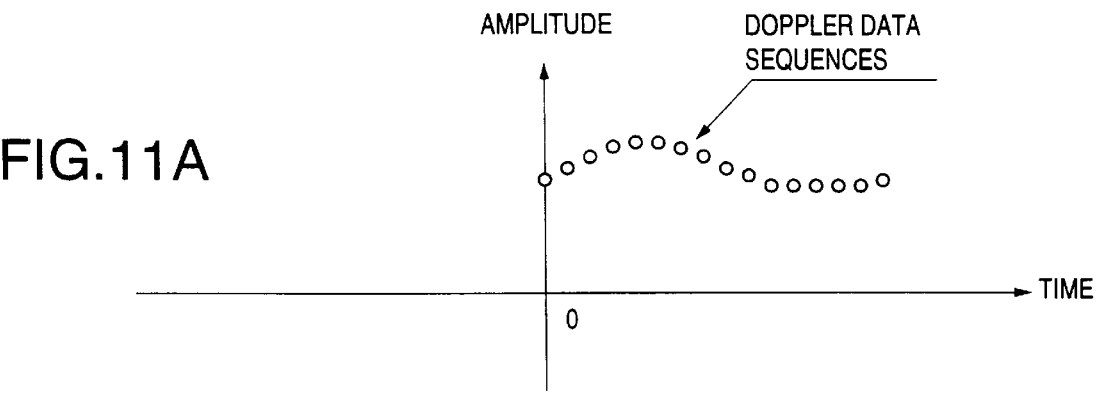
FIGS. 11(a) through 11(c) are graphs illustrating a second embodiment of the initial value subtraction process and the extrapolation process adopting the taper process of this invention.
Figure 11B:
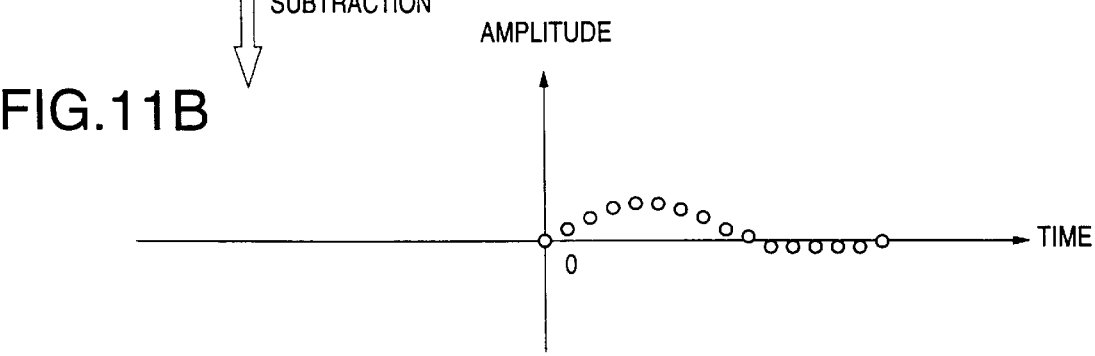
Figure 11C:
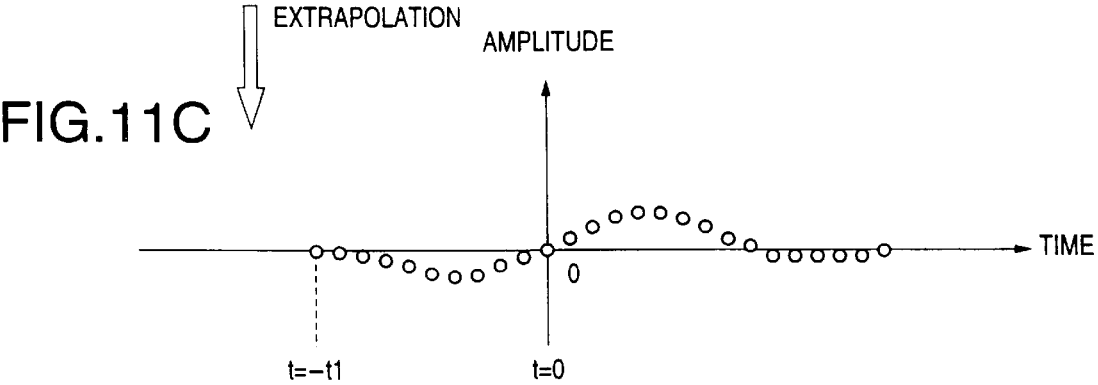

If discrete Doppler data sequences as shown in FIG. 11 are supplied to the transient response processing units 44A and 44B, an amplitude at the time starting point is subtracted as an initial value (fixed value) from the amplitude of the data sequences and Doppler data sequences are generated as shown in FIG. 11(*b*) through the initial value subtraction circuit 54.

This subtraction operation is sequentially executed for every input data sequence (at every sampling point).

After the subtraction operation, the Doppler data sequences are provided to the extrapolation circuit 55 to which extrapolated data subjected to the taper process at predetermined points in the past direction from the actual time starting point are added as shown in FIG. 11(*c*). The extrapolated data sequences are those which are extended from the starting point to the past with a differential coefficient at t=0 kept constant and for which the taper process are carried out.

The Doppler data sequences subjected to the extrapolation process (and the taper process) approach smoothly to zero at the artificial time starting point t=−t1. As shown in FIG. 11(*c*), the Doppler data sequences vary smoothly from zero amplitude at the point t=−t1, return gradually to zero amplitude again at the point t=0, and change moderately in amplitude thereafter reflecting the measured Doppler data sequences.

The Doppler data sequences provided through the initial value subtraction process and the extrapolation process (and the taper process as well) are supplied to the MTI filter units 45A (45B) where the high pass filtering process is carried out for them through the high pass filter 71. Since the data sequences vary quite smoothly, influence of transient responses at the high pass filter is low. At the same time, similar to the first embodiment, the influence of transient responses, already very little, appearing in the output of the high pass filter as high frequency components exist in the past time range ahead of the actual time starting point. The data in the past time range are discarded through the initial data cut circuit 72 so that only the measured Doppler data sequences remain for further inference of blood flow information.

This embodiment is advantageous over the first embodiment because the initial value subtraction and the extrapolation process (and the taper process) are performed in that order for the Doppler data sequences in this particular embodiment so that it can make use of the measured Doppler data at the maximum and its arithmetic operations with much higher accuracy can be executed for blood flow information.

Further, the advantages obtained primarily from the present embodiment are explained in the following way. First, the data discontinuity is eliminated through the initial value subtraction process and, then, the abrupt change remained at the time starting point is reduced through the taper-extrapolation process so that the degree of smoothness of the data becomes extremely good. The extrapolation process, therefore, makes more surely the actually measured Doppler data sequences far from the influence of the transient responses and rapid data fluctuations at the artificial time starting point can be more effectively suppressed than the first embodiment. As a result, the number of extrapolation points is less than the first embodiment and computing time and volumes for the extrapolation process can be reduced greatly with the suppression effect of the transient responses maintained.

In this particular embodiment, thus, the initial data cut circuit 72 may be unnecessary.

In the first and second embodiments, the taper process and the data extrapolation process are performed to generate the taper-extrapolated data sequences through the interpolation circuit 55. However, this invention is not limited to these embodiments. A taper processing circuit to achieve the taper process shown in FIGS. 3(*a*) through 3(*c*) and an extrapolation processing circuit to carry out the extrapolation process shown in FIG. 4(*a*) through 4(*c*) may be separately provided to determine extrapolated data sequences at a plurality of extrapolation points on a basis of an extrapolation function and to apply a taper process to the data sequences.

Third Embodiment

Figure 12:
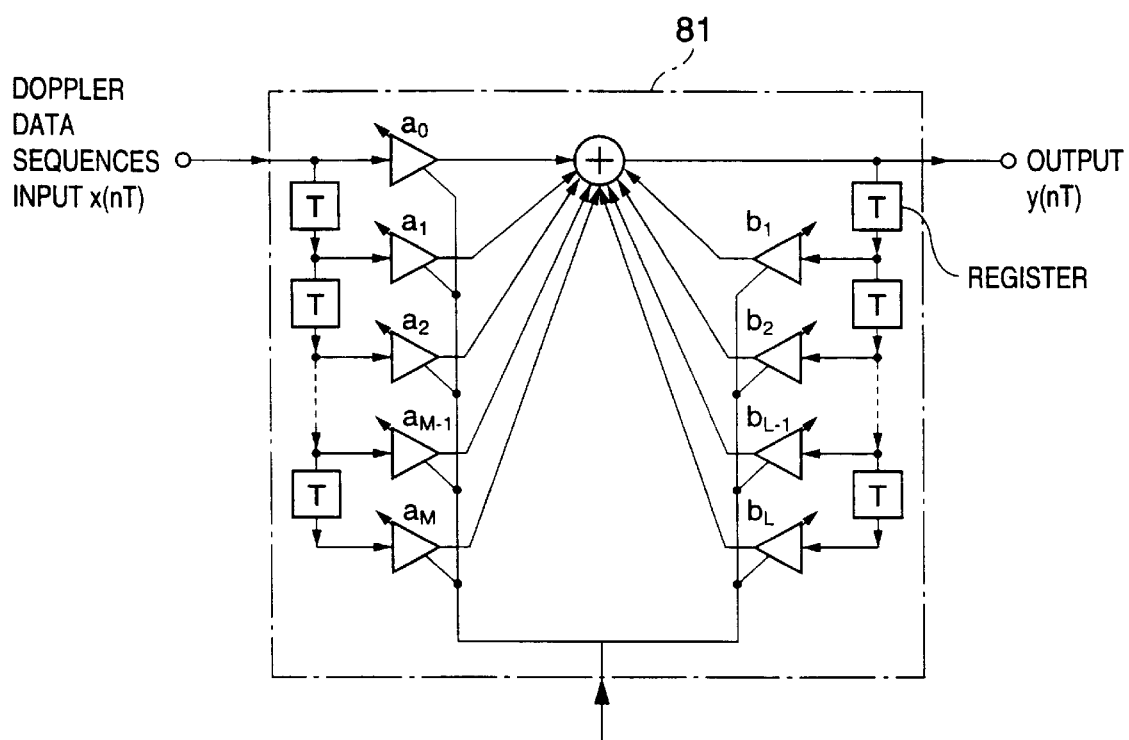
FIG. 12 is a block diagram illustrating a first order structure of a third embodiment of the high pass MTI filter of the present invention.

A ultrasound diagnostic apparatus of a third embodiment of the present invention will be hereinafter described with reference to FIGS. 12 and 13. Similar to the second embodiment, this particular ultrasound diagnostic apparatus carries out the initial value subtraction to reduce the influence of transient responses and the extrapolation process (and the taper process) to shorten its processing time.

Now, the extrapolation, taper and high pass filtering processes are taken into consideration. In order to perform the high pass filtering process after the extrapolation and taper processes, data sequences in the past can be generated as described in the first and second embodiments. The number of data to be processed, however, increases and the processing time thereof becomes longer as the number of the extrapolation points increases. The transient response processing units 44A (44B) and the MTI filter units 45A (45B) have the following structures.

The MTI filter units 45A and 45B each have a high pass filter 81 known as an MTI filter. The high pass filter 81 may be either FIR or IIR type as already set forth and have a structure of any order. An n-th order structure of the IIR type high pass filter is shown in FIG. 12. In this filter, a filter output signal $y(nT)$ for a n-th filter input signal is given in equation (1) as:

$$y(nt) = \sum_{k=0}^{M} ak \cdot x(nT - kT) + \sum_{k=1}^{L} bk \cdot y(nT - kT) \qquad (1)$$

where "x(nT)" is a n-th filter input signal, "T" an input signal interval, "ak", (k=0, 1, 2, . . . , m), and "bk", (k=1, 2, . . . , L), are filter coefficients of k-th stage filters, and "n"=1, 2, . . . , respectively.

Figure 13:
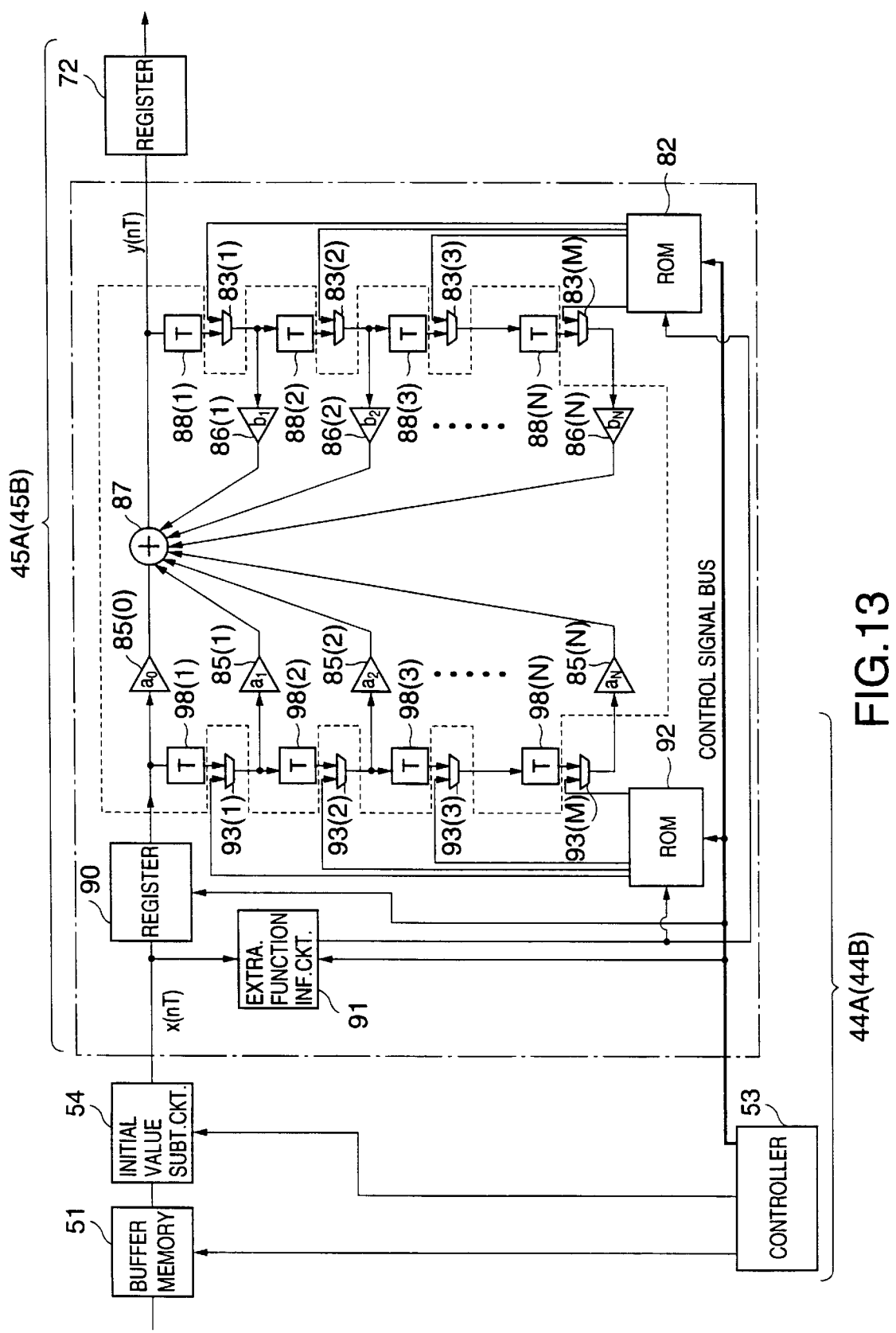
FIG. 13 is a block diagram of a third embodiment of the transient response processing unit and the MTI filter unit of the present invention.

By using this high pass filter 81, the transient response processing units 44A (44B) and the MTI filter units 45A (45B) may be constructed as shown in FIG. 13, for example. A part of the high pass filter 81 is commonly used with the transient response processing units 44A (44B). Each of the transient response processing circuit 44A (44B) is provided with a buffer memory 51, an initial value subtraction circuit 54, an extrapolation function inference circuit 91, a register 90, ROMs 92 and 82, selectors 93(1) though 93(N), selectors 83(1) through 83(N), and a controller 53. The MTI filter units 45A (45B) each include the high pass filter 81, and the initial data cut circuit 72. The initial data cut circuit 72 is, however, unnecessary in a case when the influence of transient responses does not affect the time starting point.

The Doppler data sequences "x(nT)" from the initial value subtraction circuit 54 are supplied to the high pass filter 81 through the register 90 and the extrapolation function inference circuit 91. The register 90, the ROMs 92 and 82, the selectors 83(1) through 83(N), the selectors 93(1) through 93(W), and the extrapolation function inference circuit 91 are controlled in accordance with a control signal from the controller 53. An output of the extrapolation function inference circuit 91 is provided to the ROMs 92 and 82.

The high pass filter 81 includes a multiplier 85(0) connected to the register 90, registers 98(1) through 98(N), multipliers 85(1) through 85(N) to receive an output of the selector 93(1) through 93(N), an adder 87 to add output signals of the multipliers 85(0) through 85(N) and 86(1) through 86(N) to each other, and registers 88(1) through 88(N) connected to the adder 87. The outputs of the registers 98(1) through 98(N) and 88(1) through 88(N) are connected to the selectors 93(1) through 93(N) and the selectors 83(1) through 83(N), respectively. The selectors 93(1) through 93(N) select either read-out signals from the ROM 92 or signals from the registers 98(1) through 98(N) in response to a control signal from the controller 53. Similarly, the selectors 83(1) through 83 (N) select read-out signals from one of the ROM 82 and the registers 88(1) through 88(N) in response to the control signal from the controller 53. Operations of the ROMs 92 and 82 and the selectors 93(1) through 93(N) and the selectors 83(1) through 83(N) are controlled in accordance with the control signal from the controller 53, respectively.

In the MTI filter 91 of this embodiment, the registers 98(1) through 98(N) and the registers 88(1) through 88(N) are initialized before the Doppler data sequences are supplied thereto. The MTI filter 81 is enabled after the completion of such initialization.

The Doppler data sequences x(nT) of the output from the initial value subtraction circuit 54 are held in the register 90 and are not provided to the MTI filter 81 until the registers 98(1) through 98(N) and the registers 88(1) through 88(N) have been initialized. During that period of time, the extrapolation function inference circuit 91 determines an extrapolation function indicative of an inferred Doppler data sequences of the past based on the Doppler data sequences x(nT). The extrapolation function inference circuit 91 outputs an address value in response to the inferred Doppler data sequences and a cut-off frequency of the MTI filter. In this embodiment, the address value is provided to a memory element storing the inferred past data which is the ROM 92, and another memory element storing the output of the MTI filter for the past which is the ROM 82, for example.

The ROMS 92 and 82 output data in accordance with the address value provided by the extrapolation function inference circuit 91 so that the data is sent to the selectors 93(1) through 93(N) and the selectors 83(1) through 83(N) as initial signals. In this case, the selectors 93(1) through 93(N) and the selectors 83(1) through 83(N) pass data from the ROMs 92 and 82 in response to the control signal. After the registers in the MTI filter 81 have been initialized, the selectors 93(1) through 93(N) and the selectors 83(1) through 83(N) are changed to the ordinary filter structure.

Further, the Doppler data sequences x(nT) stored in the register 90 are sent to the MTI filter 81 from which, in turn, an output signal y(nT) is obtained. The output signal y(nT) is transferred from the MTI filter 81 to an initial data cut circuit 72 where unnecessary initial data is discarded. When new Doppler data sequences pass through the initial data subtraction circuit 54, the selectors 93(1) through 93(N) and the selectors 83(1) through 83(N) are changed again to the side of the ROMs 92 and 82 and repeat the operation set forth above.

The MTI filter outputs to which the extrapolation and taper processes are applied can be obtained without substantial increase of processing operation time. The arrangements for carrying out the initial value subtraction process and the taper-extrapolated process are described in this particular embodiment but other arrangements for performing only the taper-extrapolated process may be utilized.

Fourth Embodiment

A ultrasound diagnostic apparatus of a fourth embodiment of the present invention will be explained hereinbelow with reference to FIGS. 14 through 16.

Figure 14:
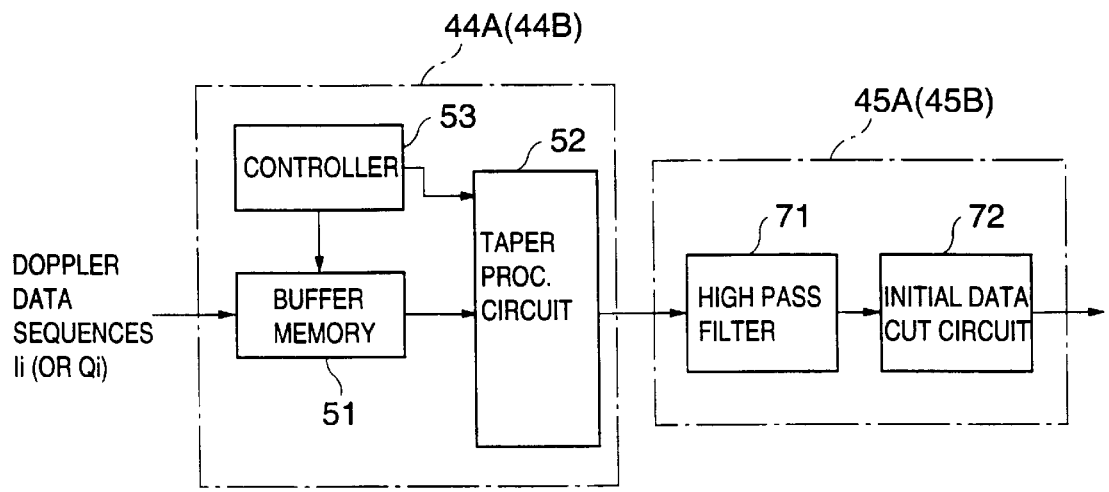
FIG. 14 is a block diagram of a fourth embodiment of the transient response processing unit and the MTI filter unit of the present invention.

This ultrasound diagnostic apparatus is substantially the same in structure as the apparatus shown in FIG. 1 except the transient response processing units 44A and 44B shown in FIG. 14 apply the taper process to the Doppler data sequences.

The transient response processing units 44A and 44B each include a buffer memory 51 provided on the input side, a taper processing circuit 52 provided on the reading-out side thereof, and a controller 53 to control the memory 51 and the taper processing circuit 52. Outputs of the A/D converter 43A (43B) are supplied to the buffer memory 51 where the three dimensional receiving Doppler data group shown in FIG. 2 is stored.

Figure 15:
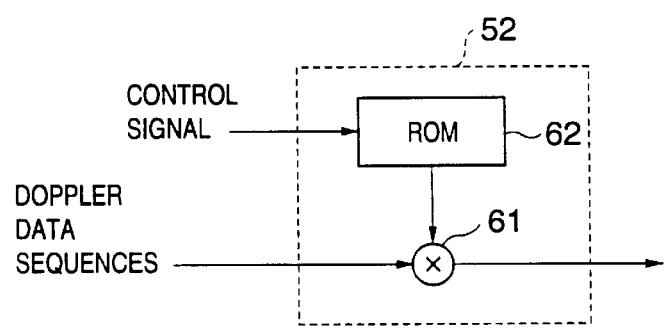
FIG. 15 is a block diagram of a taper processing unit.
Figure 16A:
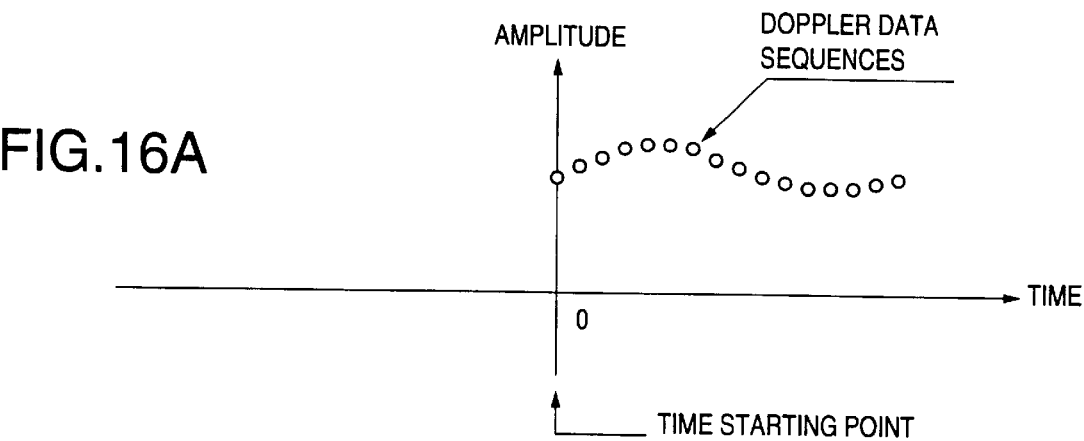
FIGS. 16(a) through 16(d) are graphs illustrating a fourth embodiment of the taper process, the high pass filtering process and the initial data cut process.
Figure 16B:
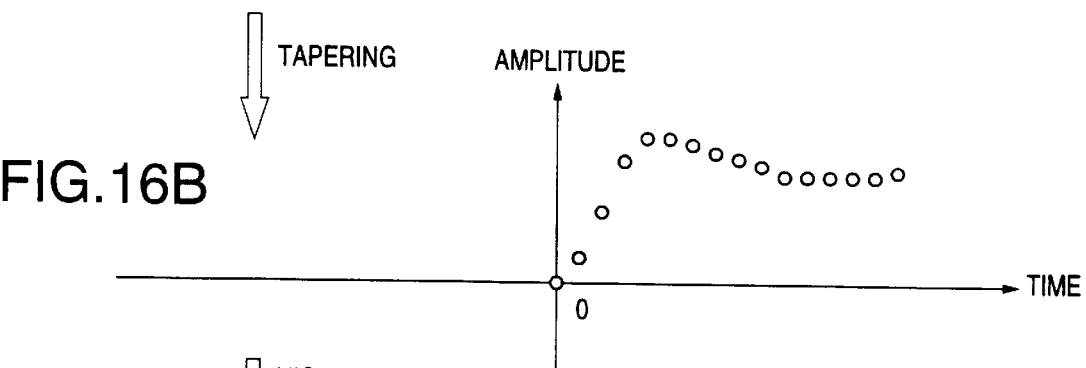
Figure 16C:
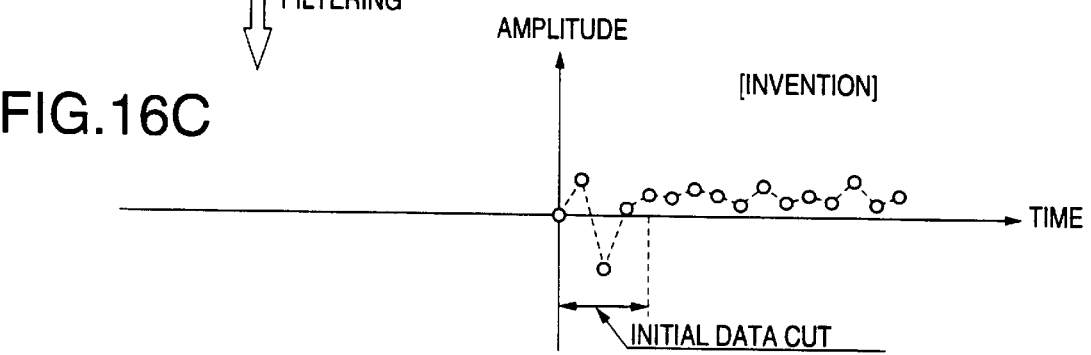
Figure 16D:
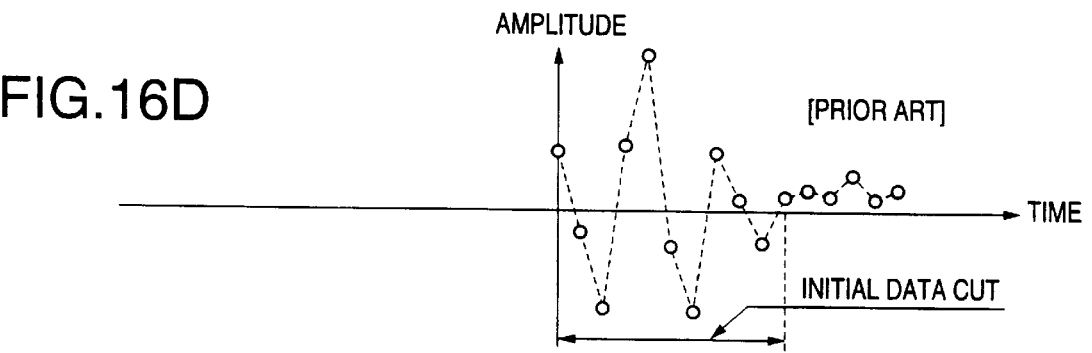

The taper processing circuit 52 is provided with a multiplier 61 and a ROM (read only memory) 62 as shown in FIG. 15. The ROM 62 stores smoothly varying weighted coefficients (taper functions) in advance as already set forth. In response to a control signal from the controller 53, the coefficients for the Doppler data sequences are read out in turn from the ROM 62 and are transferred to the multiplier 61. The coefficients and the Doppler data sequences are supplied to the multiplier 61 where multiplying operations thereof are executed in time sequential manner at every time when Doppler data input.

The controller 53 constructed with a signal generator to generate timing signals in synchronization with a system controller (not shown but occasionally called a rate pulse generator), for instance, generates control signals necessary for receiving data. The system controller may be commonly used for the controller 53.

As described previously, the echo signals are subject to the quadrature phase detection and the A/D conversion to be converted into the discrete digital Doppler data through the CFM-mode processing circuit 23. The Doppler data are supplied to the transient response processing units 44A (44B) and temporarily stored in the buffer memory 51. The Doppler data are read out from the memory 51 at a fixed timing as Doppler data sequences consisting of N Doppler data at every sampling point of a tomographic plane as shown in FIG. 16(*a*), for example. The Doppler data sequences are transferred to the next stage of taper processing circuit 52 where a taper processing is carried out as already described.

In other words, weighted coefficients read out from tables in the ROM 62 are multiplied by the Doppler data through the multiplier 61. The coefficients are set to vary more smoothly as the multiplied Doppler data sequences are closer to the time starting point and to approach zero thereat. The Doppler data sequences after multiplication (taper processing) rise smoothly at the time starting point and return to the original amplitude latter at several Doppler data therefrom as shown in FIG. 16(*b*). This taper process (tapering) is executed at each sampling point of a scanning tomographic plane for the Doppler data sequences.

The taper-processed Doppler data sequences are sent to the MTI filter units 45A (45B) and the high pass filtering therefor is executed through the high pass filter 71. The high pass filtering results in deriving from the Doppler data sequences small amplitude echo components (Doppler signals) reflecting from blood flows and substantially eliminating large amplitude echo components reflecting or scattering from tissues.

High frequency components at the time starting point of the Doppler data sequences derived out though the high pass filter 71 are, as shown in FIG. 16(*c*), remarkably less than conventional waveforms (schematically shown in FIG. 16(*d*)) for which the taper process is not carried out but the initial data subtraction is only executed. This results from the smoothness (continuity) of input signals by the taper process.

The Doppler data sequences (Doppler signals from blood flows) with less high frequency components as shown in FIG. 16(*c*) are supplied to an initial data cut circuit 72 where data are cut only at several points very close to the time starting point.

The number of cut data is much smaller than that of a conventional cut data for which the filtering process is performed after the initial value subtraction is only executed as shown in FIG. 16(*d*).

In this particular ultrasound diagnostic apparatus, the taper process is applied to the Doppler data sequences inputted to the MTI filters 45A and 45B. This is a comparatively simple treatment but it can suppress more firmly the magnitude and scope of high frequency signals included in filter output waveforms due to transient responses to the discontinuity of the Doppler data sequences and abrupt changes in the vicinity thereof. The influence of transient responses contained in a lapse of time of the output waveforms can be made extremely small in scope (time) (see and compare FIGS. 16(*c*) and 16(*d*)).

In the case of low velocity blood flows, the initial data cut treatment is effectively carried out for the output waveform data of the MTI filter units. Namely, since the amount of initial data cut is less than that of conventional ones, the number of the Doppler data remaining in the data sequences increases. The amount of Doppler data actually used for the estimation operation at the arithmetic operation circuit 46 increases so that the accuracy and detection capability of blood flow information can be improved not only in the case of high velocity of blood flows but also in the case of low velocity blood flows.

The taper process of this particular embodiment provides an zero weighted coefficient at the time starting point to avoid discontinuity thereat and, equivalently, initial value subtraction is executed after the taper process so that reduction effects of transient responses are extremely high.

Changes of Doppler signals in a lapse of time become more smooth and the influences of transient responses are more restricted as the number of Doppler data subject to the taper process increases.

The taper processing circuit 52 stores weighted coefficients in its tables in advance, but it is not necessarily limited to that structure. The taper processing circuit may be such a structure that weighted coefficients or taper function values are determined by arithmetic operations based on previously given functions at every multiplication.

Fifth Embodiment

Figure 17:
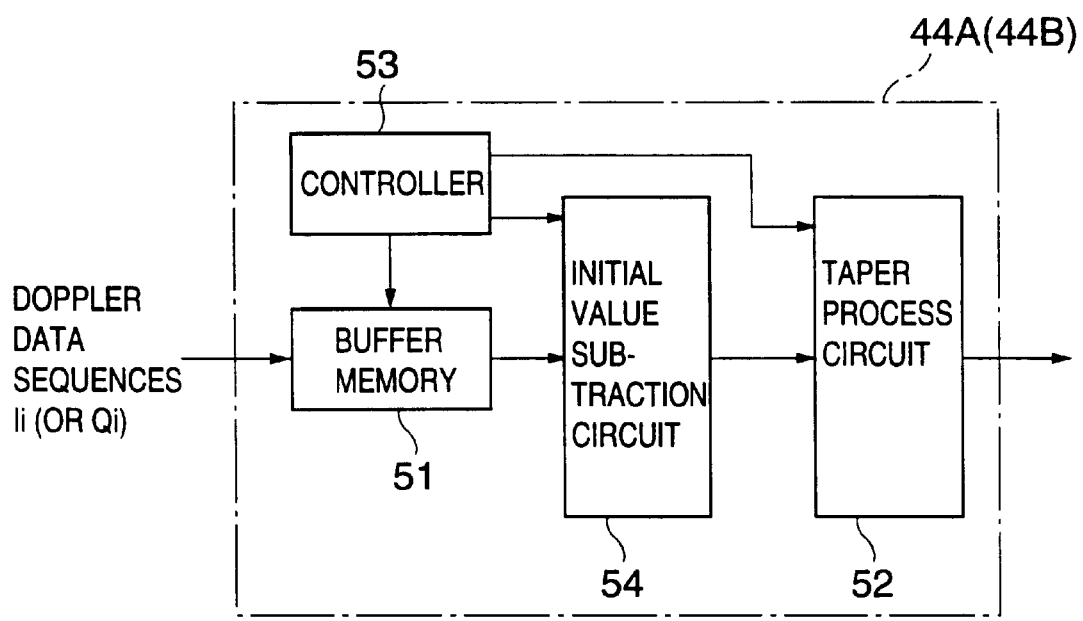
FIG. 17 is a block diagram of a fifth embodiment of the transient response processing unit of the present invention.

A ultrasound diagnostic apparatus of a fifth embodiment of the invention will be explained hereinbelow with reference to FIGS. 17 and 18.

In this ultrasound diagnostic apparatus the initial value subtraction is executed before the taper process. To achieve that operation, the ultrasound diagnostic apparatus is substantially the same in entire structure as in FIG. 1 except the transient response processing circuits 44A and 44B shown in FIG. 17.

In the transient response processing units 44A and 44B, an initial value subtraction circuit 54 is provided between a buffer memory 51 and a taper processing circuit 52. A controller 53 is provided to control operation of the buffer memory 51, the initial value subtraction circuit 54, and the taper processing circuit 52. The initial value subtraction circuit 54 and the taper processing circuit 52 are the same in structure as already described.

Other components are also substantially the same in structure as in those shown in FIG. 1.

Figure 18A:
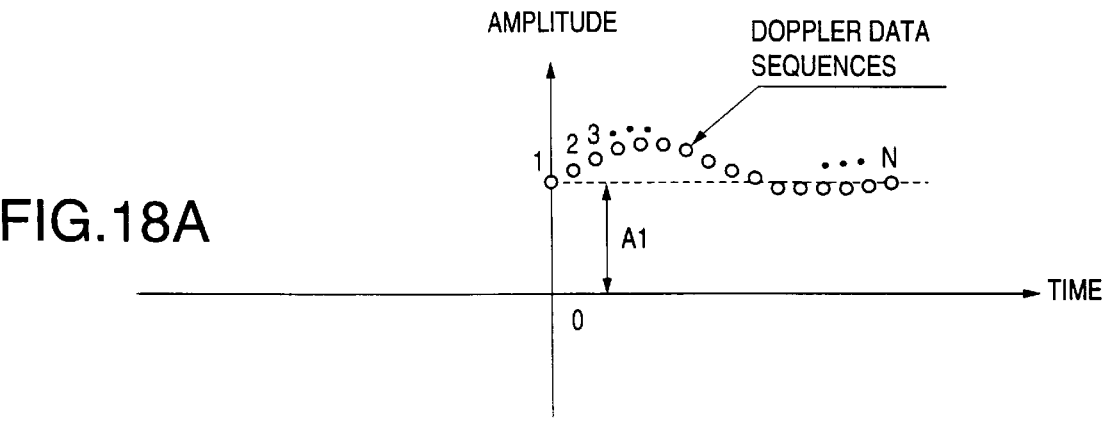
FIGS. 18(a) through 18(c) are graphs illustrating a fifth embodiment of the initial value subtraction process and the taper process of the present invention.
Figure 18B:
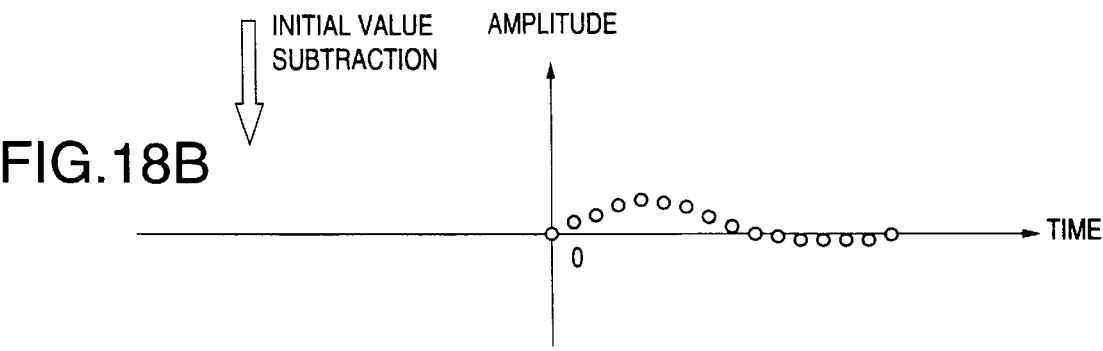
Figure 18C:
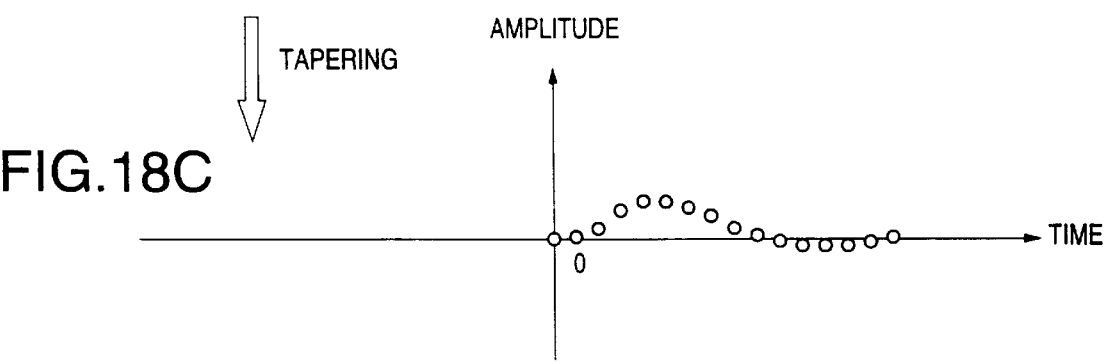
Figure 19:
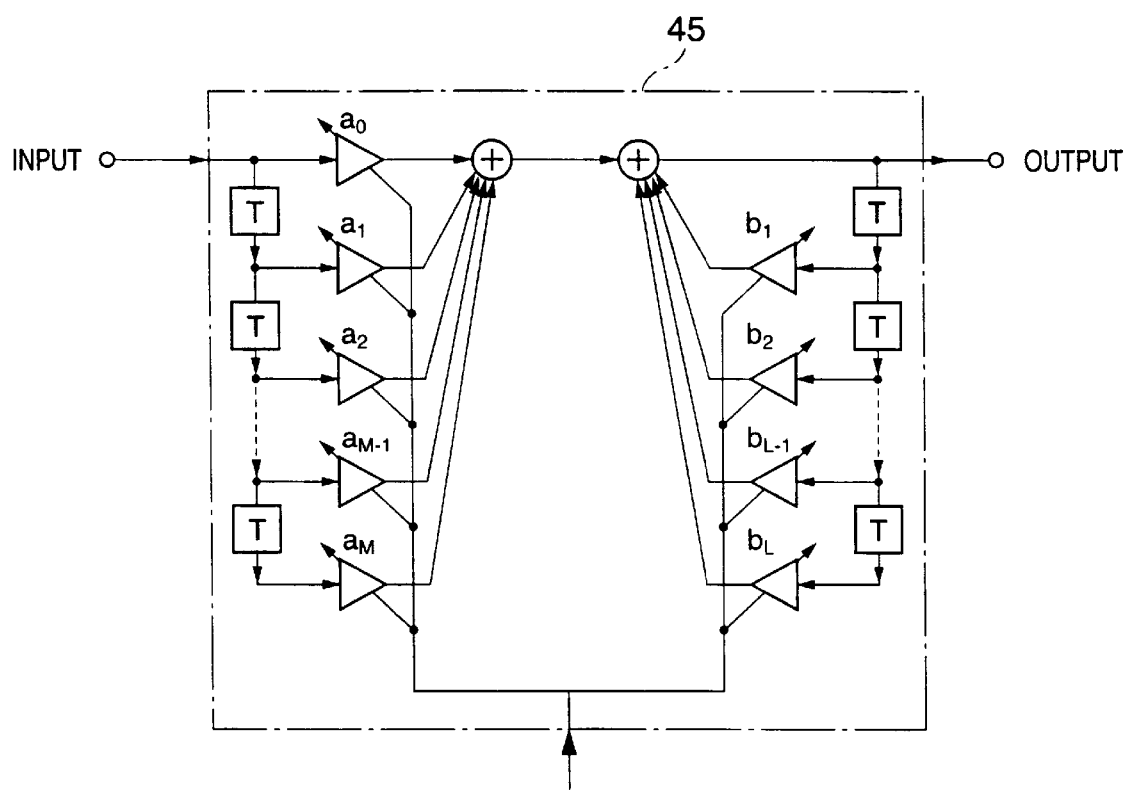
FIG. 19 is a schematic circuit diagram of a high pass MTI filter.
Figure 20A:
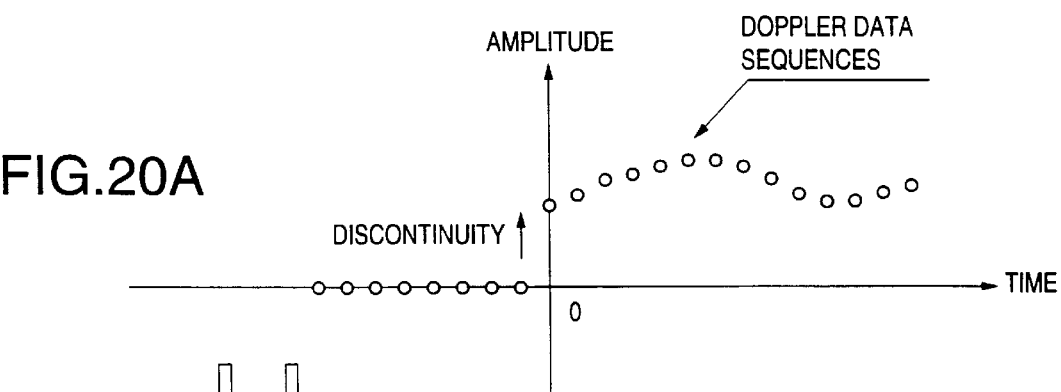
FIGS. 20 are graphs illustrating a prior art technique of a discontinuity of Doppler data sequences, occurrence of transient responses and an initial value subtraction method.
Figure 20B:
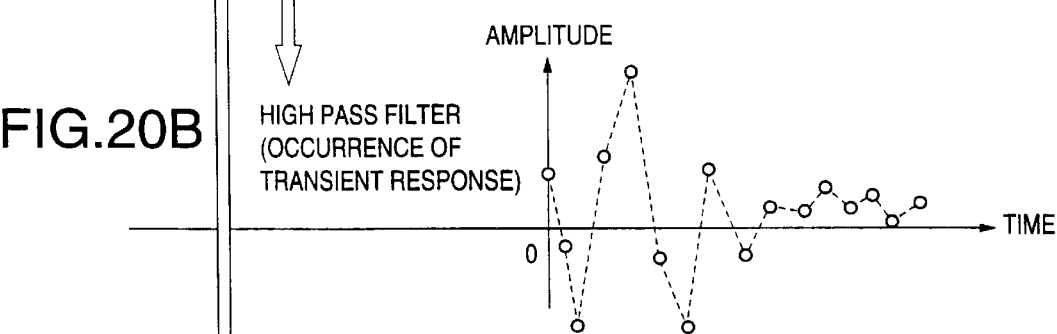
Figure 20C:
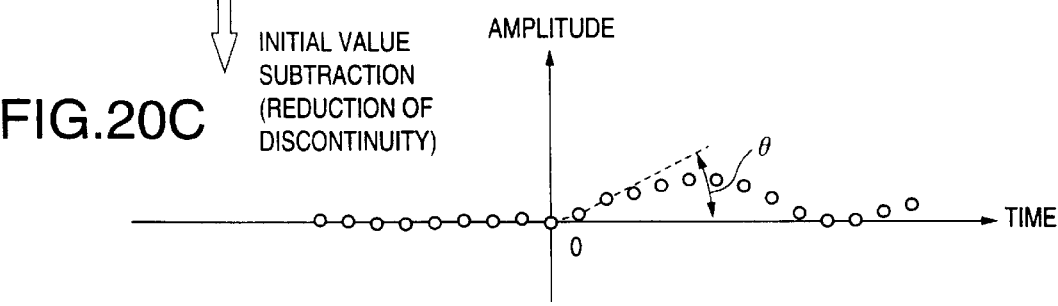
Figure 21A:
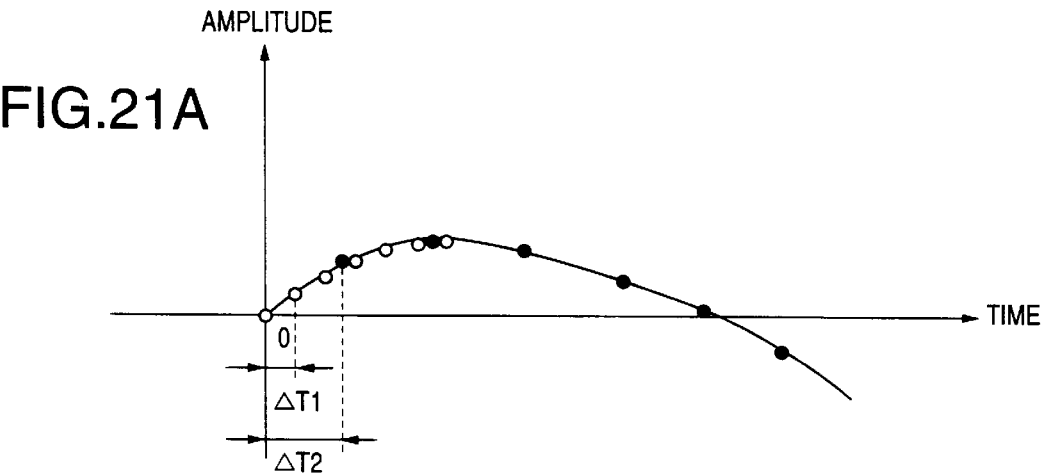
FIGS. 21(a) through 21(c) are graphs illustrating differences of sampling intervals.
Figure 21B:
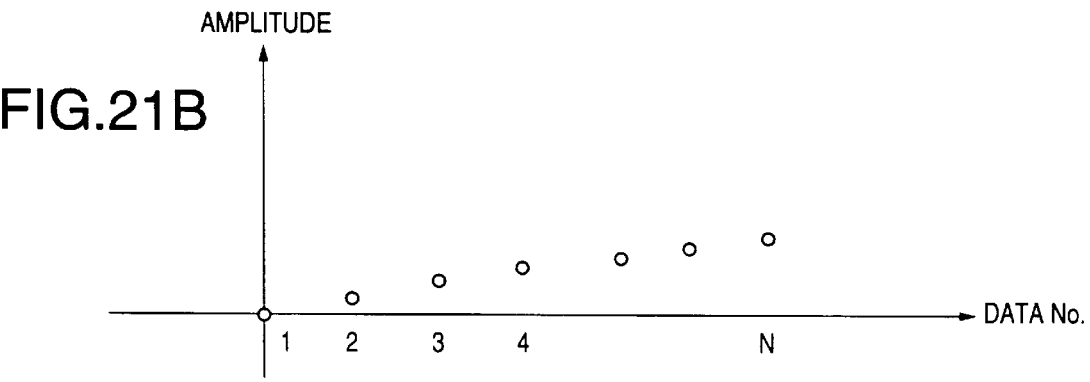
Figure 21C:
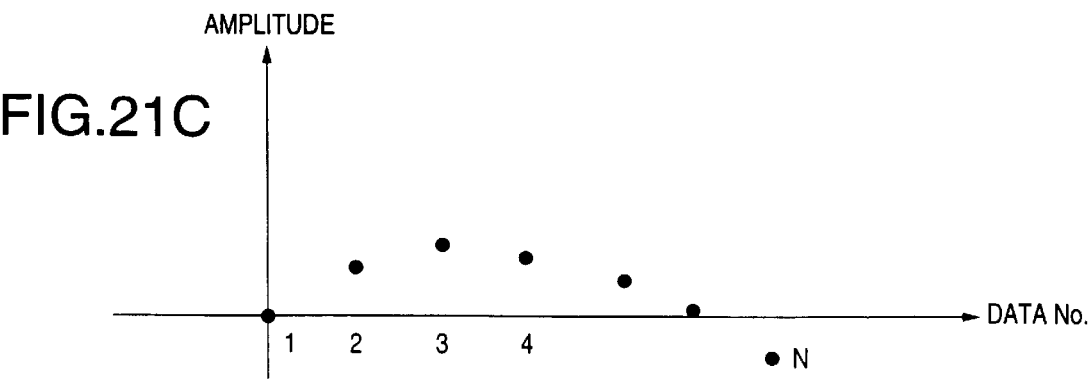

When discrete Doppler data sequences as shown in FIG. 18 (*a*), for instance, are supplied to the transient response processing units 44A and 44B, a fixed value is subtracted through the initial value subtraction circuit 54 to make out Doppler data sequences as shown in FIG. 18 (*b*). This subtraction is executed for every input data sequence (at every sampling point).

An amplitude A1 of Doppler data (data No.1) at the time starting point in the Doppler data sequences is first stored in the memory 63. The value A1 is subtracted from each of data Nos. 1 through N. As a result, the amplitude at the time starting point becomes zero and the discontinuity thereat is avoided as shown in FIG. 18(*b*). The Doppler data sequences for which the initial value subtraction is executed are supplied to the taper processing circuit 52 where the taper process is carried out therefor by using weighted coefficients or taper function values (see FIG. 3(*b*), for instance). It brings about such a result that a data rising-up curve at the time starting point is more smooth than that after the initial value subtraction operation as shown in FIG. 18(*c*).

Since the taper process is applied to set zero in weighted coefficient value at the time starting point, it is equivalent to processes in which the initial value subtraction is executed again after the initial value subtraction and the taper process have been finished up.

The Doppler data sequences processed in the way described above are transferred to the MTI filter units 45A (45B) through which the high pass filtering and the initial data cut are carried out therefor in substantially the same way as already set forth.

With the structure and functions of this ultrasound diagnostic apparatus, the initial value subtraction is first executed through the transient response processing units 44A and 44B so that coarse components of data discontinuity are first eliminated. Fine data continuity is then secured through the taper process. For that reason, data amplitude changes in the vicinity of the time starting point are more smooth and changing rates thereof are smaller than the transient response process of the first embodiment. Since the influence of transient responses (high frequency components) in the Doppler data sequences after the high pass filtering thereof is extremely little, the amount of initial data cut is made small so that the advantages provided through the fourth embodiment are further progressed. In addition, there provides a color Doppler type ultrasound diagnostic apparatus in which it is comparatively simple to carry out the transient response process, it provides high quality images by eliminating clutter components effectively, its detection capability is improved for extremely low velocity blood flows, and its reliability is enhanced.

According to a ultrasound diagnostic apparatus of the present invention, clutter components are eliminated from Doppler data sequences detected through transmitting and receiving ultrasound signals and dynamic information of blood flows can be obtained based on the Doppler data sequences after such elimination of the clutter components. The ultrasound diagnostic apparatus includes transient responses processing circuits (e.g., an extrapolation circuit to extrapolate data sequences after application of a taper process to the Doppler data sequences, a combination thereof with a fixed value subtraction circuit and the like) through which an appropriate elimination of clutter components is carried out and influences of transient responses due to data discontinuity at the time starting point of the Doppler data sequences and abrupt data changes in the vicinity thereof are sufficiently suppressed so that detection capability with high accuracy is obtained for blood flows. Since the so-called initial data cut process to discard part of measured data after filtering process through an MTI filter is additionally used and the number of the measured data to be discarded is set to be zero or extremely small, information estimation with high accuracy can be made even for the low velocity blood flows.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A ultrasound diagnostic apparatus comprising:

a transmitting and receiving device configured to transmit ultrasound pulses in a time sequential manner at a plurality of times in each scanning direction along a cross section of a subject body, to receive ultrasound echoes of the ultrasound pulses reflecting from the subject body, and to convert the ultrasound echoes into electrical echo signals;

a Doppler signal detector configured to detect a plurality of discrete Doppler data sequences at sampling points in each direction from the electrical echo signals;

a filter having a frequency characteristic configured to pass from the Doppler data sequences Doppler components corresponding to fluids in the subject body and substantially to reduce clutter components of the Doppler data sequences due to objects other than fluids in the subject body;

a transient response processing device configured to suppress influences of transient responses in the output of said filter, comprising a modifying data generator which generates at least one of a taper sequence and an extrapolation data sequence for application to said Doppler data sequences to make the Doppler data sequences smooth and continuous from a time reference point of said Doppler data sequences; and a computing device configured to obtain a color flow mapping image of the fluids from an output of said transient response processing device.

2. The ultrasound diagnostic apparatus according to claim 1, wherein said data generator is configured to generate extrapolation data sequences to make the Doppler data sequences smooth and continuous from a time prior to the time reference point.

3. The ultrasound diagnostic apparatus according to claim 1, wherein said transient response processing device further comprises:

a subtractor configured to subtract a fixed value from the amplitude of the Doppler data sequences; and wherein said data generator is configured to generate extrapolation data sequences based on outputs of said subtractor to make the Doppler data sequences smooth and continuous from a time prior to the time reference point.

4. The ultrasound diagnostic apparatus according to claim 3, wherein said data generator is configured to generate extrapolation data sequences which are continuously connected to the Doppler data sequences at a time reference point of the Doppler data sequences.

5. The ultrasound diagnostic apparatus according to claim 4, wherein said data generator is configured to generate extrapolation data sequences in response to a differential coefficient of the Doppler data sequences at the time reference point thereof.

6. The ultrasound diagnostic apparatus according to claim 5, wherein said data generator is configured to generate extrapolation data sequences in response to a differential coefficient defined between an initial part of the Doppler data sequences at the time reference point and at least one data of the Doppler data sequences following the initial part.

7. The ultrasound diagnostic apparatus according to claim 6, wherein said data generator is configured to generate taper data sequences to carry out a taper process applied to the Doppler data sequences such that amplitudes of the Doppler data sequences vary continuously and smoothly from a predetermined value after a time reference point.

8. The ultrasound diagnostic apparatus according to claim 6, wherein said modifying data generator comprises:

a memory configured to store weighted coefficients; and a multiplier configured to multiply the Doppler data sequences by the weight coefficients.

9. The ultrasound diagnostic apparatus according to claim 5, wherein said data generator is configured to generate taper data sequences to carry out a taper process applied to the Doppler data sequences such that amplitudes of the Doppler data sequences vary continuously and smoothly from a predetermined value after a time reference point.

10. The ultrasound diagnostic apparatus according to claim 5, wherein said modifying data generator comprises:

a memory configured to store weighted coefficients; and a multiplier configured to multiply the Doppler data sequences by the weight coefficients.

11. The ultrasound diagnostic apparatus according to claim 4, wherein said data generator is configured to generate taper data sequences to carry out a taper process applied to the Doppler data sequences such that amplitudes of the Doppler data sequences vary continuously and smoothly from a predetermined value after a time reference point.

12. The ultrasound diagnostic apparatus according to claim 4, wherein said modifying data generator comprises:

a memory configured to store weighted coefficients; and a multiplier configured to multiply the Doppler data sequences by the weight coefficients.

13. The ultrasound diagnostic apparatus according to claim 3, further including a data discarding device configured to discard a predetermined number of data of outputs from said filter.

14. The ultrasound diagnostic apparatus according to claim 13, wherein said data discarding device is configured to discard the predetermined number of data corresponding to the extrapolated data sequences of the outputs from said filter.

15. The ultrasound diagnostic apparatus according to claim 3, wherein said subtraction device comprises:

a memory configured to store amplitudes of the Doppler data sequences at the time reference point as a fixed value, said subtraction device subtracting the fixed value from the Doppler data sequences.

16. The ultrasound diagnostic apparatus according to claim 1, wherein said data generator is configured to generate taper data sequences to carry out a taper process applied to the Doppler data sequences such that amplitudes of the Doppler data sequences vary continuously and smoothly from a predetermined value after a time reference point.

17. The ultrasound diagnostic apparatus according to claim 1, wherein said modifying data generator comprises:

a memory configured to store weighted coefficients; and a multiplier configured to multiply the Doppler data sequences by the weight coefficients.

18. The ultrasound diagnostic apparatus according to claim 1, further comprising:

a data discarding device connected to said filter device to discard a predetermined number of data of outputs therefrom.

19. An ultrasound diagnostic apparatus comprising:

a transmitting and receiving device configured to transmit ultrasound pulses in a time sequential manner at a plurality of times in each scanning direction along a cross section of a subject body, to receive ultrasound echoes of the ultrasound pulses reflecting from the subject body, and to convert the ultrasound echoes into electrical echo signals;

a Doppler signal detector configured to detect a plurality of discrete Doppler data sequences at sampling points in each direction from the electrical echo signals;

a transient response processing device including a filter configured to suppress influences of transient responses in the Doppler data sequences, said filter being provided with a memory configured to store extrapolation data sequences and outputs of said filter, and a control device configured to control insertion of the extrapolation data sequences into the Doppler data sequences; and a computing device configured to obtain a color flow mapping image of fluids from an output of said transient response processing device.

* * * * *